US012809106B2

(12) United States Patent
Carroll et al.

(10) Patent No.: US 12,809,106 B2
(45) Date of Patent: Nov. 24, 2026

(54) FIBER OPTIC CABLE ASSEMBLY FOR AN EQUIPMENT RACK AND METHOD OF USING SAME

(71) Applicant: CORNING RESEARCH & DEVELOPMENT CORPORATION, Corning, NY (US)

(72) Inventors: Edward Joseph Carroll, Hickory, NC (US); Terry Lee Cooke, Hickory, NC (US); Michael Todd Faulkner, Granite Falls, NC (US); Shane Blackburn Harmon, Statesville, NC (US); Christopher Shawn Houser, Hickory, NC (US); Jason Anthony Lewis, Hickory, NC (US); Lars Kristian Nielsen, Denver, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 346 days.

(21) Appl. No.: 18/591,519

(22) Filed: Feb. 29, 2024

(65) Prior Publication Data

US 2024/0310597 A1 Sep. 19, 2024

Related U.S. Application Data

(60) Provisional application No. 63/451,672, filed on Mar. 13, 2023.

(51) Int. Cl.
*G02B 6/44* (2006.01)

(52) U.S. Cl.
CPC ................................ *G02B 6/44528* (2023.05)

(58) Field of Classification Search
CPC .................................................. G02B 6/44528
See application file for complete search history.

(56) References Cited

U.S. PATENT DOCUMENTS 5,394,502 A 2/1995 Caron
7,006,739 B2 2/2006 Elkins et al.
(Continued)

FOREIGN PATENT DOCUMENTS

EP 2116881 A1 11/2009
JP 2000-258672 A 9/2000
(Continued)

OTHER PUBLICATIONS

Extended European Search Report, EP application No. 24162658.9, dated Aug. 8, 2024, 10 pages, European patent office.

*Primary Examiner* — Sung H Pak
(74) *Attorney, Agent, or Firm* — Adam R. Weeks

(57) ABSTRACT

A fiber optic cable assembly includes a fiber optic cable and a plurality of distribution housings along its length. The distribution housings include a tubular portion with a first passageway that receives optical fibers of the fiber optic cable and a branch portion with a second passageway. The second passageway intersects the first passageway and receives a subset of optical fibers that define tap cables branching away from the main fiber optic cable. The distribution housing includes one or more bend limiters adjacent the intersection between the passageways to limit bending of the tap cables. The distribution housings may include movement restrictors to limit movement of the distribution housings relative to the fiber optic cable. An equipment rack having such a fiber optic cable assembly is disclosed. A method of using the fiber optic cable assembly in an equipment rack to provide a plug-and-play capability is also disclosed.

21 Claims, 22 Drawing Sheets

(56) References Cited

U.S. PATENT DOCUMENTS

| | | | | |
|---|---|---|---|---|
| 7,422,378 | B2 | 9/2008 | Lu et al. | |
| 11,209,604 | B2 | 12/2021 | Yokokawa et al. | |
| 11,467,363 | B1 * | 10/2022 | Clines | G02B 6/4459 |
| 11,880,082 | B2 | 1/2024 | Cao et al. | |
| 2007/0041695 | A1 * | 2/2007 | Weinert | G02B 6/4459<br>385/135 |
| 2008/0181570 | A1 | 7/2008 | Mullaney | |
| 2008/0253722 | A1 | 10/2008 | Gronvall et al. | |
| 2008/0277015 | A1 | 11/2008 | Tanaka et al. | |
| 2016/0103290 | A1 | 4/2016 | Loeffelholz et al. | |
| 2019/0235180 | A1 | 8/2019 | Madhav | |
| 2022/0357542 | A1 * | 11/2022 | Cooke | G02B 6/4475 |

FOREIGN PATENT DOCUMENTS

| | | | |
|---|---|---|---|
| WO | 2020/214762 | A1 | 10/2020 |
| WO | 2021/154572 | A1 | 8/2021 |
| WO | 2021/178134 | A1 | 9/2021 |

* cited by examiner

FIBER OPTIC CABLE ASSEMBLY FOR AN EQUIPMENT RACK AND METHOD OF USING SAME

PRIORITY APPLICATION

This application claims the benefit of priority of U.S. Provisional Application No. 63/451,672, filed on Mar. 13, 2023, the content of which is relied upon and incorporated herein by reference in its entirety.

TECHNICAL FIELD

This disclosure relates generally to fiber optic cables, and more particularly to a pre-engineered fiber optic cable assembly for pre-installation into an equipment rack, such as a rack at a data center. The disclosure also relates to a method of using the fiber optic cable assembly in the equipment rack to provide a plug-and-play capability.

BACKGROUND

The large amount of data and other information transmitted over the internet has led businesses and other organizations to develop large scale data centers for organizing, processing, storing and/or disseminating large amounts of data. Data centers contain a wide range of network equipment including, for example, servers, networking switches, routers, storage subsystems, etc. Data centers further include a large amount of cabling and equipment racks to organize and interconnect the network equipment in the data center. Modern data centers may include multi-building campuses having, for example, one primary or main building and a number of auxiliary buildings in close proximity to the main building. All the buildings on the campus are interconnected by a local fiber optic network.

Data center design and cabling-infrastructure architecture are increasingly large and complex. To manage the interconnectivity of a data center, the network equipment within the buildings on the data center campus is often arranged in structured data halls having a large number of spaced-apart rows. Each of the rows is, in turn, configured to receive a number of equipment racks or cabinets (e.g., twenty racks or cabinets) which hold the network equipment. In some data center architectures, each of the rows includes a main patch panel at a front or head end of the row. Distribution cables with a relatively large number of optical fibers (high fiber counts) are routed from a building distribution frame (sometimes referred to as a main distribution frame) to the main patch panels (sometimes part of cabinets or equipment referred to as an intermediate distribution frame) for the different rows of equipment racks. At the main patch panels, a large number of distribution fiber optic cables with lower fiber counts are connected to the optical fibers of the associated high fiber count distribution cable(s) and routed along the row to connect to the network equipment held in the various racks in the row. To organize the large number of in-row distribution fiber optic cables, each row typically includes a cable tray or basket disposed above the row for supporting the distribution fiber optic cables as they extend along the row. The network equipment in the racks is optically connected to the distribution fiber optic cables by technicians during the construction of the data center using a large number of jumper cables.

While current data center design and cabling-infrastructure architecture are satisfactory for the current needs of the industry, the labor, installation time, and costs to achieve the interconnectivity of the data center can be high. For these reasons, manufacturers continually strive to improve the interconnectivity in the data center. One approach to improve optical infrastructure installation efficiency is to pre-engineer certain infrastructure components. For example, various pre-engineered cables for row interconnectivity at data centers are disclosed in PCT Patent Publication No. WO2020214762A1 ("the '762 publication"), the disclosure of which is incorporated herein by reference. According to this disclosure, an installer unpacks the pre-connectorized fiber optic cable distribution cable, pulls or routes the cable along the cable tray above the row, snaps in connectors at the row main patch panel (e.g., at the head end of the row), and then at each of the racks in the row, installs jumpers between connectors of the distribution cable and the respective network equipment in the racks. The use of a pre-engineered row distribution cable saves a significant amount of time, effort, and costs compared to on-site connectorization and assembly of cables.

While pre-engineered cables like those in the '762 publication may assist with reducing labor, installation time and costs, the demand for even faster, lower cost installation remains. For example, there is a desire for the equipment racks used in a data center to have plug-and-play capability. In this way, a rack may be delivered to a data center with the network equipment and associated fiber optic cabling pre-installed; positioned in its designed location within a row of a data hall of the data center; connected to a row distribution cable in the overhead cable tray; and connected to a power source to provide interconnectivity and functionality. It is believed that by providing equipment racks with plug-and-play features, labor, installation time, and costs for data center construction will be further decreased.

SUMMARY

In one aspect of the disclosure, a fiber optic cable assembly for an equipment rack supporting network equipment is disclosed. The equipment rack fiber optic cable assembly includes a fiber optic cable having a distribution end, a terminal end, and a plurality of optical fibers. The plurality of optical fibers is terminated at the distribution end by a plurality of distribution connectors. A plurality of distribution housings is attached to the fiber optic cable in spaced relation along a length of the fiber optic cable. Each of the plurality of distribution housings includes a tubular portion having an inlet end, an outlet end and a first passageway extending between the inlet end and the outlet end. The first passageway is configured to receive at least some of the plurality of optical fibers of the fiber optic cable. Each of the plurality of distribution housings further includes at least one branch portion extending from the tubular portion and having a branch inlet end coupled to the tubular portion, a branch outlet end, and a second passageway extending between the branch inlet end and the branch outlet end. The second passageway intersects and is in communication with the first passageway. The second passageway is configured to receive a subset of the at least some of the plurality of optical fibers received through the inlet end of the tubular portion. The subset of the at least some of the plurality of optical fibers defines a plurality of tap cables. The plurality of tap cables is terminated by a plurality of tap connectors. The distribution housing further includes at least one bend limiter adjacent the intersection between the first passageway and the second passageway to limit bending of the plurality of tap cables as the tap cables branch away from the at least some of the plurality of optical fibers in the tubular portion and extend into the at least one branch portion.

In one embodiment, the at least one bend limiter may include a mandrel defining an arcuate surface and the arcuate surface may be configured to limit bending of the plurality of tap cables. In another embodiment, the at least one bend limiter may include a pair of mandrels on opposed sides of the intersection between the first passageway and the second passageway to limit bending of the plurality of tap cables. The use of two mandrels may provide bidirectionality to the distribution housing (i.e., equal functionality in two orientations). In a further embodiment, the at least one branch portion may have a curved shape and the at least one bend limiter may be formed by a curved surface of the branch portion. In these embodiments, the arcuate surface of the at least one mandrel or the curved surface of the at least one branch portion may be selected to have a radius of curvature greater than a threshold value to prevent damage to the plurality of tap cables (e.g., breakage) and diminished performance due to high optical losses.

In one embodiment, each of the plurality of distribution housings may include a first half shell and a second half shell connectable to each other to form the distribution housing. For example, the first half shell and the second half shell may be connected together in a clam-shell configuration to form the distribution housing. More particularly, the first half shell and the second half shell may be pivotally connected and moveable between an opened position, where the at least some of the plurality of optical fibers are insertable into the first passageway and the second passageway, and a closed position, where the at least some of the plurality of optical fibers are enclosed by the distribution housing. In one exemplary embodiment, the first half shell and the second half shell may be connected by a hinge, such as a living hinge. Additionally, in the closed position, the first half shell and the second half shell may be connected by securing means such as one or more frictional press fits and/or one or more latch elements on the opposing half shells.

In one embodiment, the first half shell and the second half shell may be identical to each other. In this way, only one part has to be manufactured, such as by a molding process. In an alternative embodiment, however, the first half shell and the second half shell may include some asymmetries that allow the two half shells to mate together. For example, in one embodiment, the first half shell may include at least one projection and the second half shell may include at least one pocket, and when the first half shell is coupled to the second half shell, the at least one projection is received in the at least one pocket to form the at least one mandrel. In another embodiment, the first half shell may include a first pocket and a first projection, the second half shell may include a second pocket and a second projection, and when the first half shell is coupled to the second half shell, the first projection is received in the second pocket and the second projection is received in the first pocket to form a pair of mandrels.

In one embodiment, the at least one branch portion may include one branch portion that extends in a direction substantially perpendicular to the tubular portion. In an alternative embodiment, the at least one branch portion may include a first branch portion that extends toward the terminal end of the fiber optic cable. In this embodiment, when the distribution housing is connected to the fiber optic cable, the included angle between the first branch portion and the tubular portion may be between about 120° and about 150°. In a further embodiment, the at least one branch portion may include a second branch portion that extends toward the distribution end of the fiber optic cable when the distribution housing is connected to the fiber optic cable. In this embodiment, the included angle between the first branch portion and the second branch portion may be between about 60° and about 120°. In one embodiment, the at least one branch portion may be a generally straight body extending from the tubular portion. In an alternative embodiment, however, the at least one branch portion may be curved, for example, to provide a curved surface for limiting the bending of the plurality of tap cables.

In one embodiment, each of the plurality of distribution housings may further include at least one movement limiter configured to limit the movement of the distribution housing relative to the fiber optic cable. For example, in one embodiment, the at least one movement limiter includes at least one abutment surface on the at least one mandrel, and the at least one abutment surface is configured to engage an edge of a slot in the fiber optic cable to limit the movement of the distribution housing relative to the fiber optic cable. In another embodiment, the at least one movement limiter may include at least one lock pin extending into the first passageway of the tubular portion, and the at least one lock pin is configured to engage a corresponding at least one lock receiver in the fiber optic cable to limit the movement of the distribution housing relative to the fiber optic cable. In this embodiment, for example, the at least one movement limiter may include a plurality of lock pins and a plurality of lock receivers that engage each other to limit the movement of the distribution housing relative to the fiber optic cable. In yet another embodiment, the at least one movement limiter may include friction-creating elements in the first passageway of the tubular portion, and the friction-creating elements are configured to engage with the at least some of the plurality of optical fibers to limit the movement of the distribution housing relative to the fiber optic cable. The friction-creating elements may include dimples, grooves, coating, or combinations thereof.

In one embodiment, at least one of the plurality of distribution housings may include at least one connection means for attaching the fiber optic cable assembly to the equipment rack. For example, the at least one connection means may include at least one magnet associated with the at least one of the plurality of distribution housings. In an exemplary embodiment, the at least one of the plurality of distribution housings may include a plurality of magnets. In an alternative embodiment, the at least one connection means may include a spring clip on an outer surface of the at least one of the plurality of distribution housings. Moreover, in an exemplary embodiment each of the distribution housings of the fiber optic cable assembly may include at least one connection means.

In one embodiment, at least one of the distribution housings of the fiber optic cable assembly is bidirectional. In this way, for example, the at least one distribution housing may be arranged on the fiber optic cable in multiple orientations rather than one specific orientation, which can lead to assembly errors. Thus, in this embodiment, even if the at least one distribution housing were attached to the fiber optic cable in an inverted orientation, the distribution housing would remain fully functional in the same manner as if the distribution housing were attached to the fiber optic cable in the proper orientation.

In another aspect of the disclosure, an equipment rack includes a patch panel arranged in the equipment rack and having a plurality of first connection ports, the plurality of first connection ports being configured to be connected to a fiber optic network, a plurality of equipment bays defined in the equipment rack, each of the plurality of equipment bays including network equipment defining a plurality of second connection ports, and the fiber optic cable assembly according to the first aspect described above. The plurality of distribution connectors is connected to respective first connection ports in the patch panel and the plurality of tap connectors at each of the plurality of distribution housings is connected to respective second connection ports in at least one equipment bay in the equipment rack. Additionally, the fiber optic cable assembly is attached to the equipment rack so that each of the plurality of distribution housings is adjacent to the at least one equipment bay to which its plurality of tap cables is connected.

In one embodiment, the plurality of tap cables from each of the plurality of distribution housings may be connected to respective second connection ports associated with only one equipment bay in the equipment rack. In an alternative embodiment, however, the plurality of tap cables from at least one of the plurality of distribution housings may be connected to respective second connection ports associated with only two adjacent equipment bays in the equipment rack.

In another aspect according to the disclosure, a method of installing the fiber optic cable assembly in the equipment rack is disclosed. The equipment rack includes a patch panel arranged in the equipment rack having a plurality of first connection ports, the plurality of first connection ports being configured to be connected to a fiber optic network, and a plurality of equipment bays defined in the equipment rack, each of the plurality of equipment bays including network equipment defining a plurality of second connection ports. The method includes securing each of the plurality of distribution housings to the equipment rack at locations adjacent to at least one equipment bay to which its plurality of tap cables is to be connected, connecting the plurality of distribution connectors to respective first connection ports in the patch panel, and connecting the plurality of tap connectors at each of the plurality of distribution housings to respective second connection ports in the at least one equipment bay in the equipment rack.

In one embodiment, connecting the plurality of tap cables from each of the plurality of distribution housings may further include connecting the plurality of tap cables from each of the plurality of distribution housings to respective second connection ports associated with only one equipment bay in the equipment rack. In an alternative embodiment, connecting the plurality of tap cables from each of the plurality of distribution housings may further include connecting the plurality of tap cables from each of the plurality of distribution housings to respective second connection ports associated with only two adjacent equipment bays in the equipment rack. Such an arrangement allows the tap cables to have a minimum length and the avoidance of excess cable length provides a cleaner, more managed appearance to the equipment rack.

In one embodiment, the network equipment and the pre-engineered fiber optic cable assembly may be installed in the equipment rack prior to transporting the equipment rack to an installation site. In this way, for example, the equipment rack may be transported to the installation site, delivered to its designed area at the installation site, connected to the local fiber optic network at the installation site at the patch panel (e.g., connected to row distribution cables), and connected to a power source to provide functionality. Thus, the equipment rack is designed to have a plug-and-play capability that simplifies the construction of large fiber optic installations, such as data centers.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
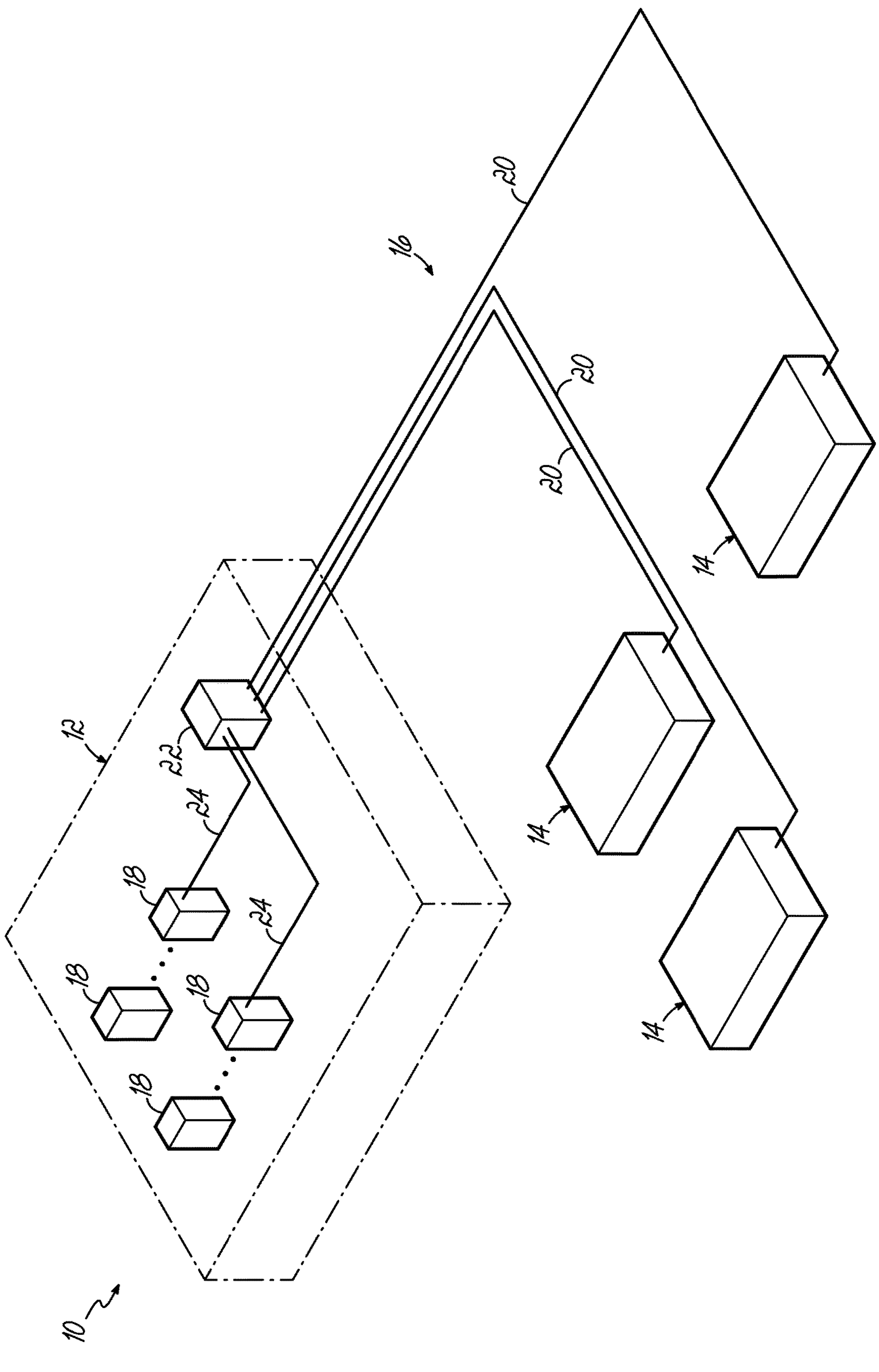
FIG. 1 is a schematic illustration of a data center campus according to an exemplary embodiment of the disclosure.

Various embodiments will be further clarified by examples in the description below. In general, the description relates to a fiber optic cable assembly for an equipment rack including a fiber optic cable and a plurality of distribution housings spaced along a length of the cable. At each of the distribution housings, a plurality of tap cables is separated or branched off from the main fiber optic cable. The distribution housings are configured to include bend limiters that limit the amount of bending of the tap cables as they branch away from the main fiber optic cable. The bend limiters avoid breakage or other damage to the optical fibers of the tap cables. The distribution housings may have a two-part construction that allows the distribution housings to be installed about the fiber optic cable. For example, the distribution housings may have a clam-shell configuration. Alternatively, the two parts of the distribution housings may be separate from each other and connected together, through various securing means such as press fits and latches, to form the distribution housings.

The description also relates to an equipment rack having a patch panel and a plurality of equipment bays in which network equipment is loaded therein. As used in this disclosure, an “equipment bay” refers to a rack unit space or some multiple of rack unit spaces. A rack unit space is commonly referred to as a “U-space” or “RU”. It is well-established in the telecommunications industry that each rack unit has a standardized height of 1.75 inches (44.5 millimeters), and that network equipment is designed to fit within some multiple of that height. As a first example, 1RU network equipment is designed to be received in a 1RU space, such that the associated equipment bay is the 1RU space. As a second example, 2RU network equipment is designed to be received in 2RU spaces, such that the associated equipment bay is the 2RU space.

The equipment racks according to this disclosure further include the inventive fiber optic cable assembly disposed in the rack to connect the patch panel to the network equipment in the equipment bays. The distribution housings are spaced along the fiber optic cable assembly such that when installed in the rack, the distribution housings are located immediately adjacent to at least one of the equipment bays, such as immediately to a side of at least one equipment bay. The tap cables from each of the distribution housings may be connected to the network equipment in only one equipment bay. However, the distribution housings may alternatively be located immediately adjacent to two equipment bays, and the tap cables from each of the distribution housings may be connected to the network equipment in only two adjacent (e.g., vertically stacked) equipment bays. Furthermore, the distribution housings may include various connection means, such as magnets, spring clips, or the like, for securing the distribution housings to the rack immediately adjacent the desired equipment bays.

As illustrated in FIG. 1, a modern-day data center 10 may include a collection of buildings (referred to as a data center campus) having, for example, a main building 12 and one or more auxiliary buildings 14 in close proximity to the main building 12. While three auxiliary buildings are shown, there may be more or less depending on the size of the campus. The data center 10 provides for a local fiber optic network 16 that interconnects the auxiliary buildings 14 with the main building 12. The local fiber optic network 16 allows network equipment 18 in the main building 12 to communicate with various network equipment (not shown) in the auxiliary buildings 14. In the exemplary embodiment shown, the local fiber optic network 16 includes trunk cables 20 extending between the main building 12 and each of the auxiliary buildings 14. Conventional trunk cables 20 generally include a high fiber-count arrangement of optical fibers for passing data and other information through the local fiber optic network 16. In the example illustrated in FIG. 1, the trunk cables 20 from the auxiliary buildings 14 are routed to one or more distribution cabinets 22 housed in the main building 12 (one shown).

Within the main building 12, a plurality of indoor fiber optic cables 24 (“indoor cables 24”) are routed between the network equipment 18 and the one or more distribution cabinets 22. The indoor cables 24 generally include a high fiber-count arrangement of optical fibers for passing data and other information from the distribution cabinets 22 to the network equipment 18. Although only the interior of the main building 12 is schematically shown in FIG. 1 and discussed above, each of the auxiliary buildings 14 may house similar equipment for similar purposes. Thus, although not shown, each of the trunk cables 20 may be routed to one or more distribution cabinets 22 in one of the auxiliary buildings 14 in a manner similar to that described above. Furthermore, each of the auxiliary buildings 14 may include indoor cables 24 that extend between network equipment 18 and the one or more distribution cabinets 22 of the auxiliary building 14.

Figure 2:
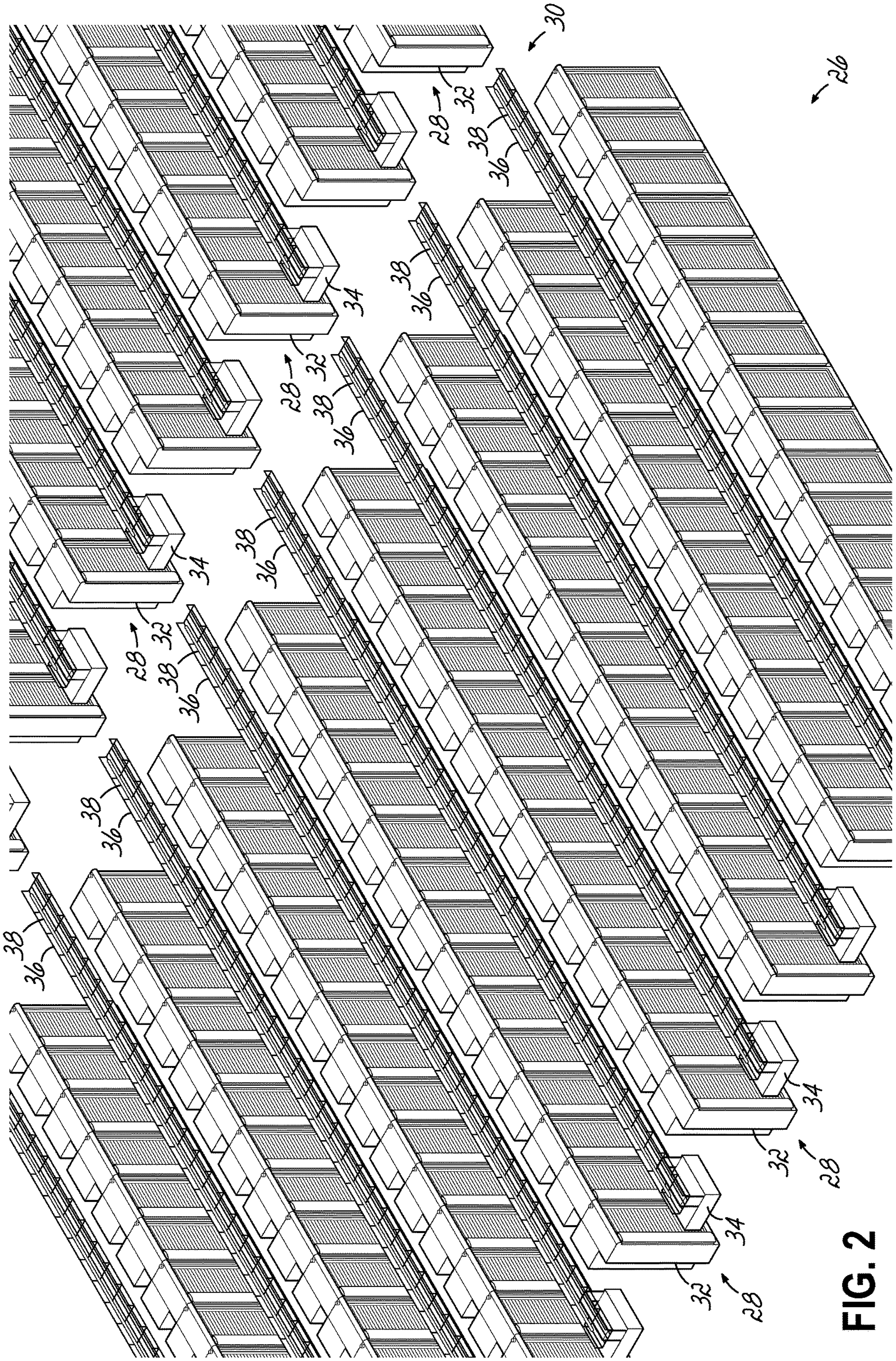
FIGS. 2 and 3 are partial perspective views of an exemplary data hall of the data center shown in FIG. 1 according to one embodiment.
Figure 3:
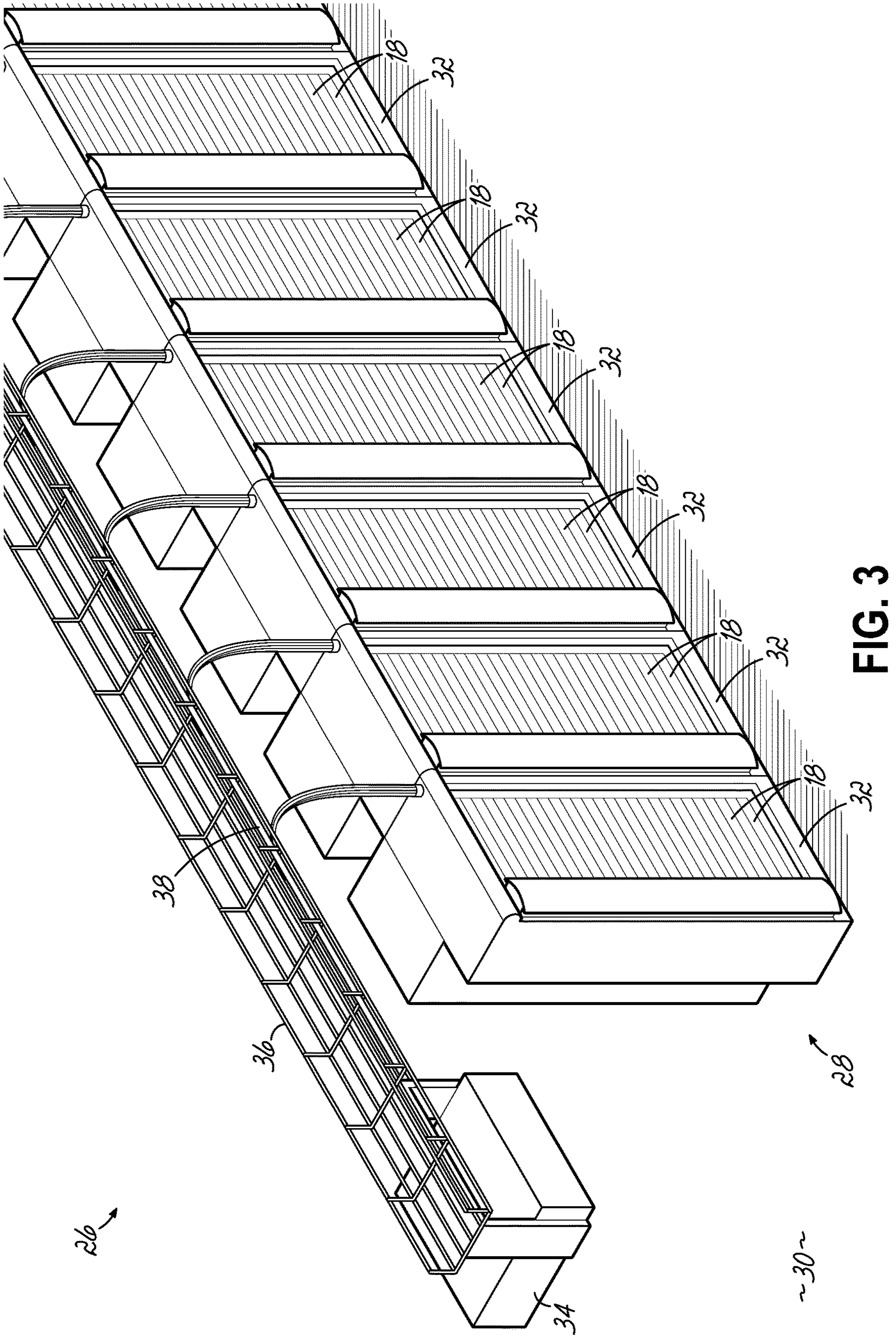

As illustrated in more detail in FIGS. 2 and 3, the network equipment 18 in the main building 12 or an auxiliary building 14 may be arranged in one or more data halls 26 that generally include a plurality of spaced-apart rows 28 on one or both sides of an access pathway 30. The arrangement of the data halls 26 into rows 28 helps organize the large number of equipment, fiber optic cables, fiber optic connections, etc. Each of the rows 28 includes a plurality of equipment racks or cabinets 32 (referred to hereafter as “racks 32”) generally arranged one next to the other along the row 28. Each of the racks 32 is a vertically arranged framework for holding various network equipment 18 of the data center 10, as is generally known in the telecommunications industry. In one common arrangement, and as further illustrated in FIG. 2, each row 28 may include a main patch panel 34 at the head end of the row 28 closest to the access pathway 30. The patch panel 34 represents a termination point of at least some of the optical fibers carried by one or more of the indoor cables 24, for example. Although the patch panel 34 is shown as being positioned above the row 28, in other embodiments the patch panel may be in a cabinet (not shown) at the head end of the row 28 or in the first rack 32 at the head end of the row 28. In yet other embodiments, the patch panel 34 may be located within the associated row, such as in the middle of the row, and be above, below, or within one of the racks 32, and be above, below, or within one of the racks 32.

Figure 4:
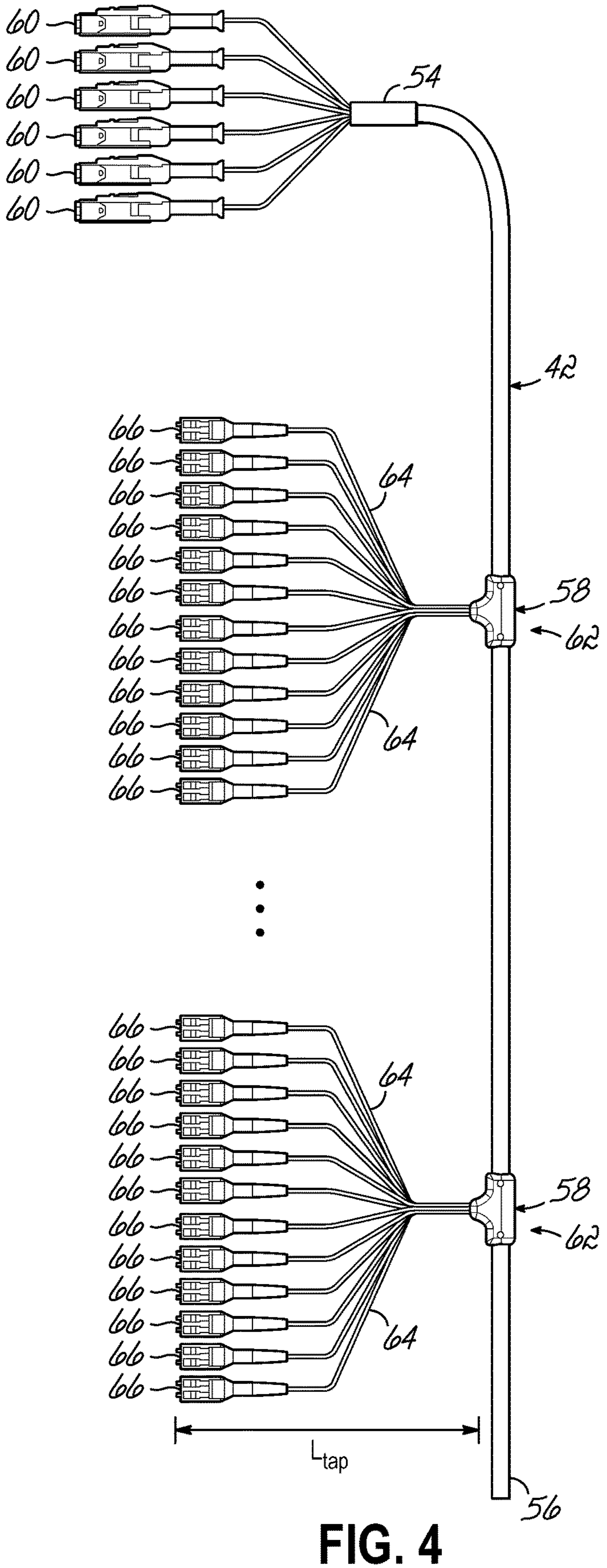
FIG. 4 is fiber optic cable assembly according to an embodiment of the disclosure.

As discussed above, in a conventional arrangement, one or more distribution cables 38 (only a representative one is shown in FIGS. (2 and 3) are connected to the patch panel 34 of a row 28 and routed along a cable tray 36 generally disposed above the row 28. The network equipment 18 in the racks 32 is then optically connected to the one or more distribution cables 38 to provide the interconnectivity of the network equipment 18 of the data center 10. Aspects of the present disclosure are directed to an improved pre-engineered fiber optic cable assembly for pre-installation into the racks 32 that make up the row 28. The rack fiber optic cable assembly is configured to optically connect the network equipment 18 in the racks 32 with the one or more distribution cables 38 in the cable tray 36 in an improved manner as will be described below. FIG. 4 illustrates an exemplary fiber optic cable assembly 40 for a rack 32 in accordance with an embodiment of the disclosure (referred to herein as a "rack cable assembly 40"). As explained in detail below, the rack cable assembly 40 facilitates the optical connection between the network equipment 18 in a rack 32 and a distribution cable 38 routed along the row 28 in the cable tray 36 generally above the racks 32. The rack cable assembly 40 is pre-engineered to include connectors at ends of the rack cable assembly 40 as part of the cable manufacturing process (i.e., the cable 40 is pre-connectorized at the manufacturing facility). Additionally, the rack cable assembly 40 may be pre-installed with the rack 32 to minimize or prevent field installation, and thereby provide an enhanced plug-and-play capability to the cable racks 32.

Figure 5:
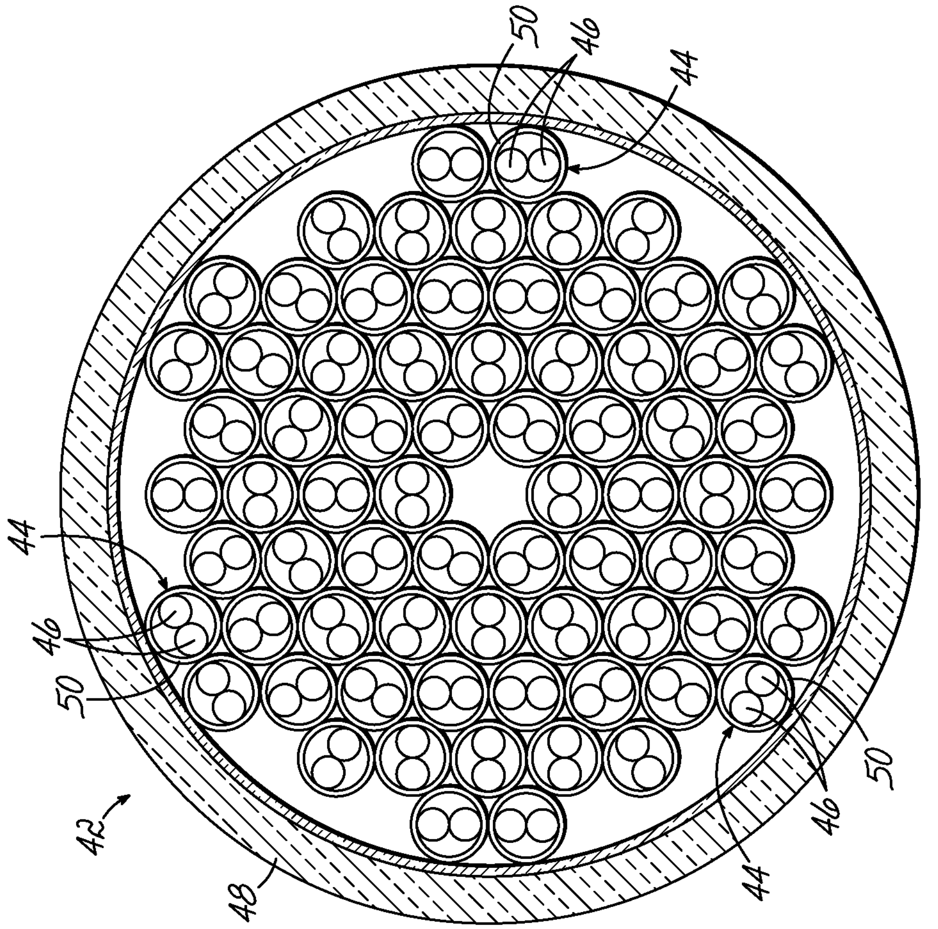
FIG. 5 is a cross-sectional view of the fiber optic cable assembly shown in FIG. 4.
Figure 6A:
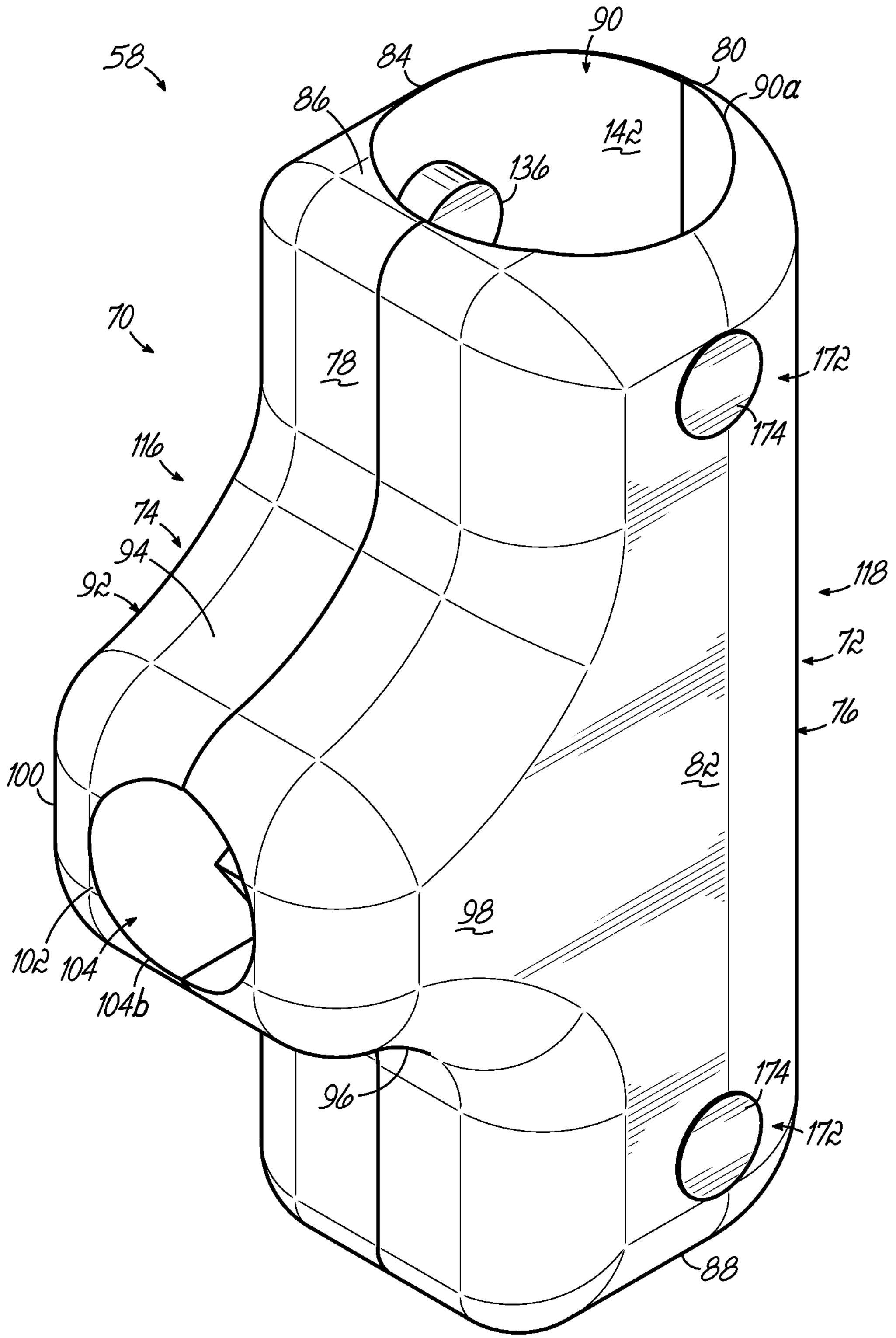
FIG. 6A is a perspective view of a distribution housing for the fiber optic cable assembly according to one embodiment of the disclosure.
Figure 6B:
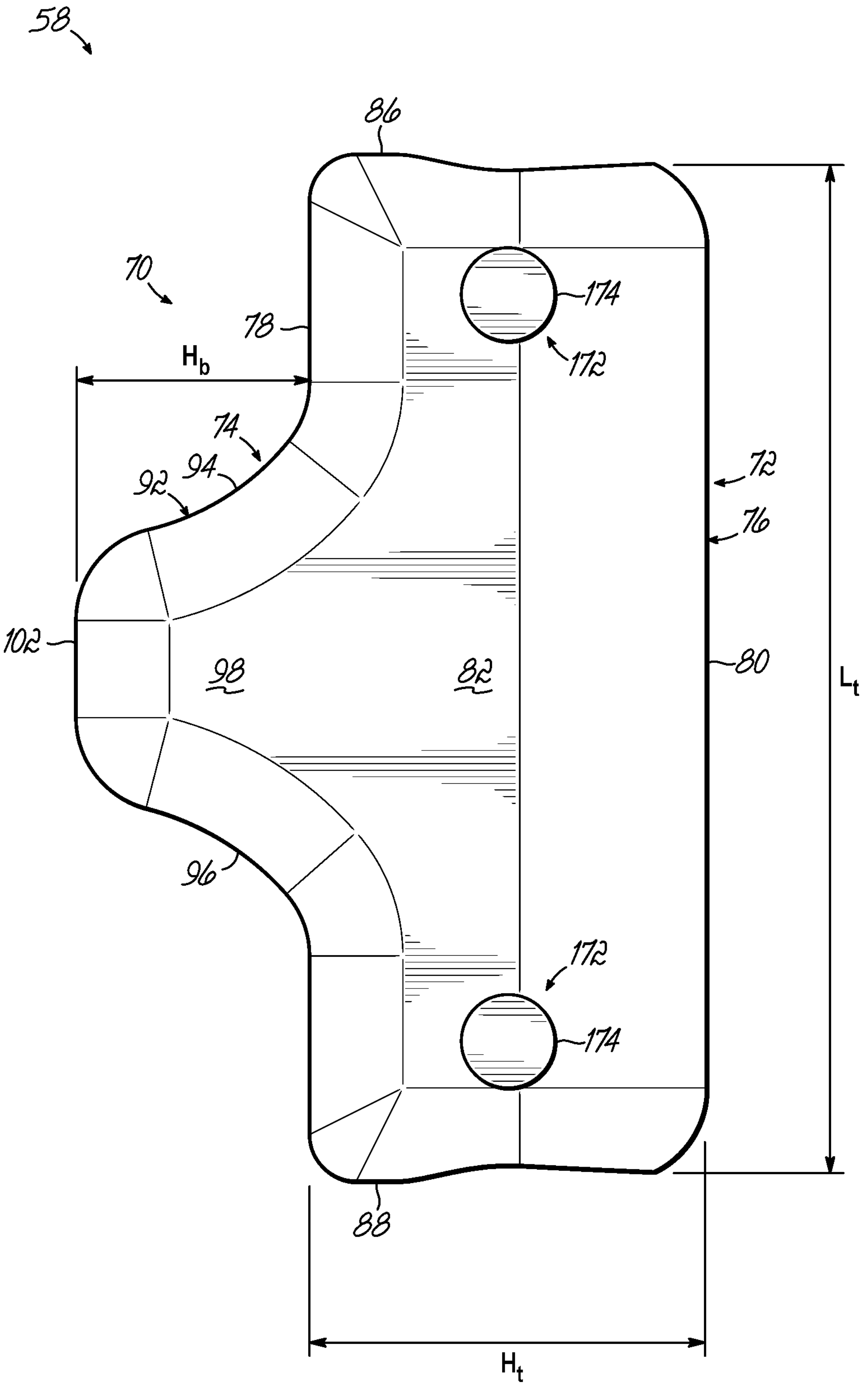
FIG. 6B is a side plan view of the distribution housing shown in FIG. 6A.
Figure 6C:
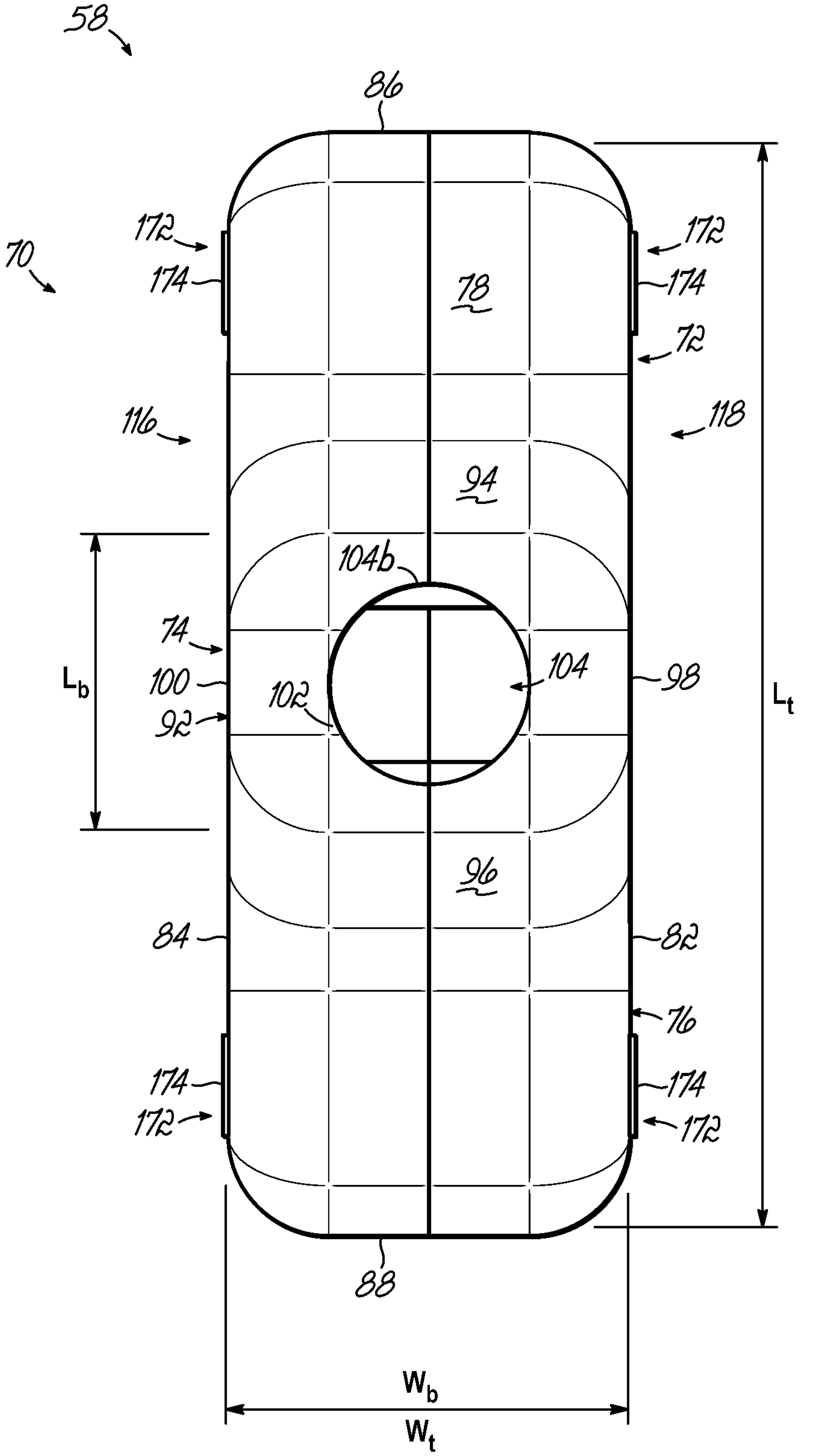
FIG. 6C is a front view of the distribution housing shown in FIG. 6A.
Figure 6D:
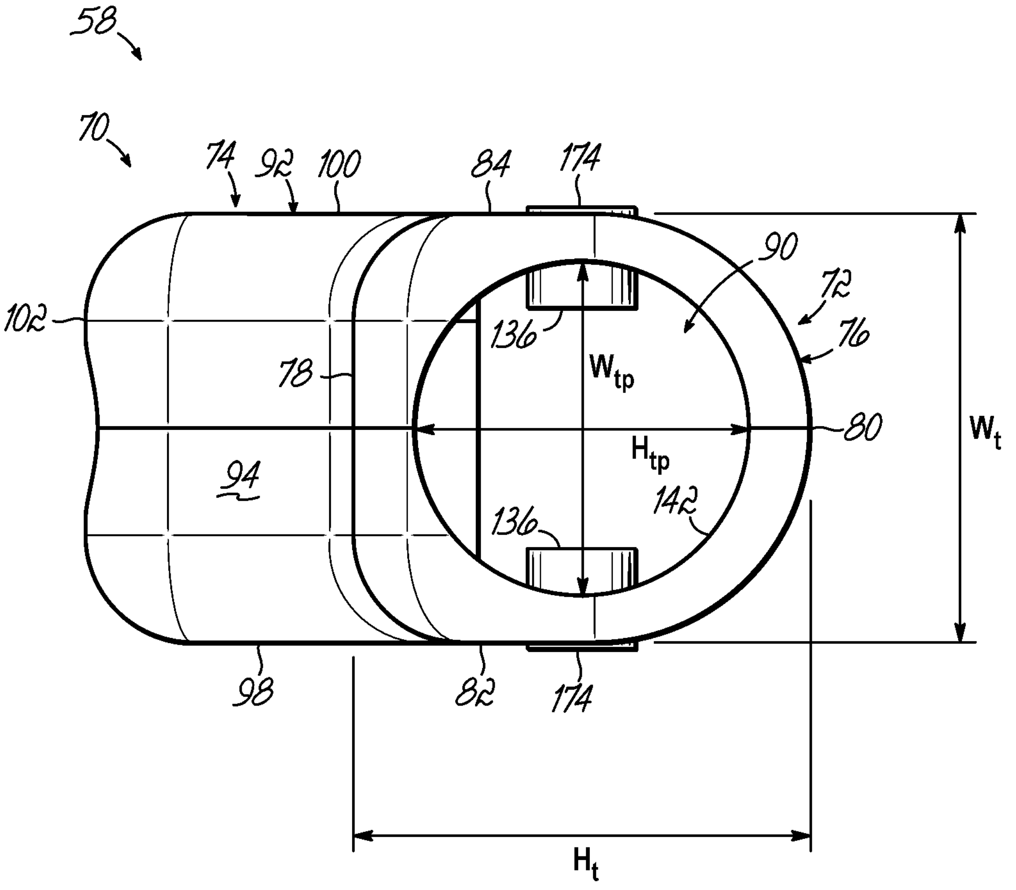
FIG. 6D is a top view of the distribution housing shown in FIG. 6A.
Figure 6E:
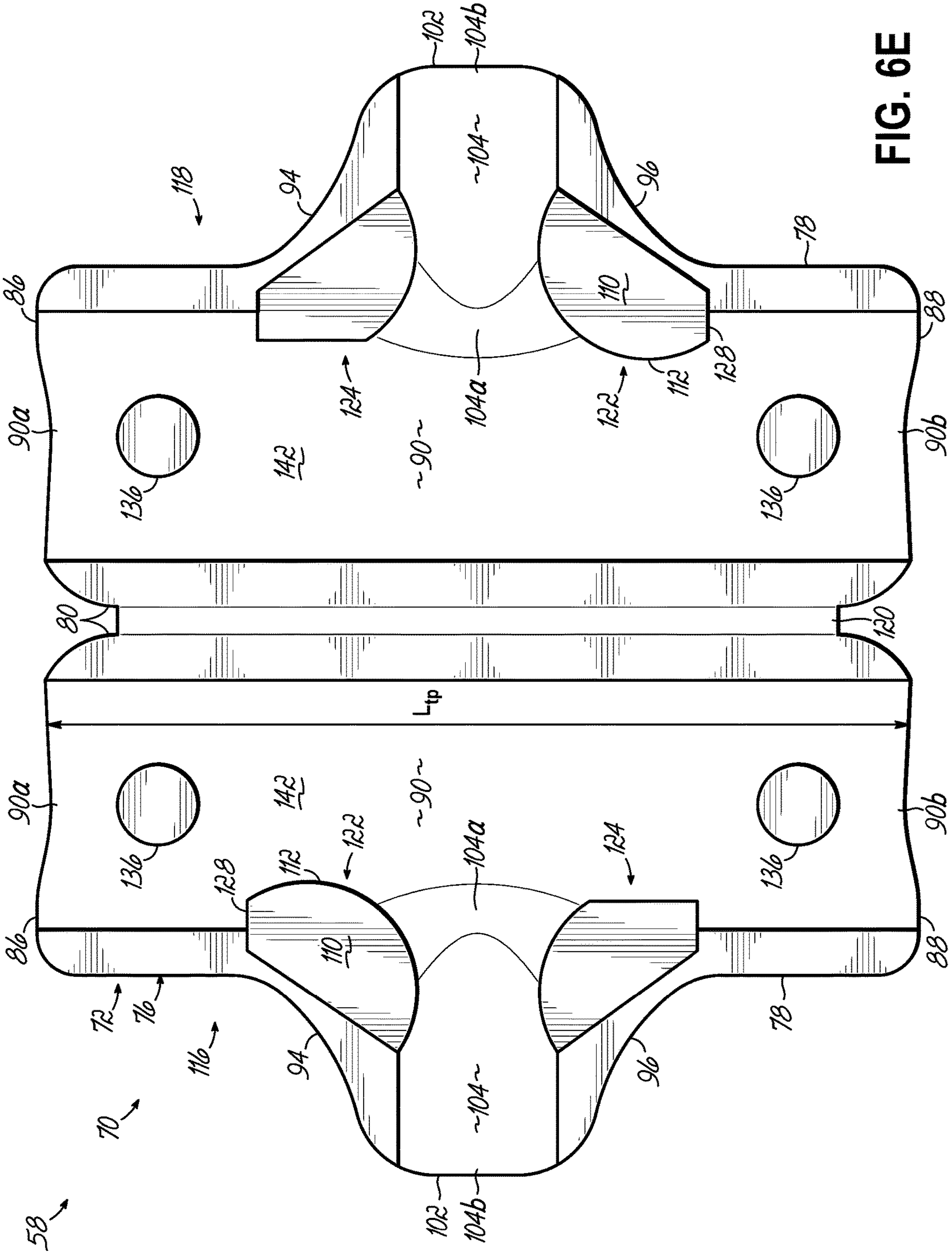
FIG. 6E is a view of the distribution housing shown in FIG. 6A with a clamshell configuration and in an opened position.
Figure 6F:
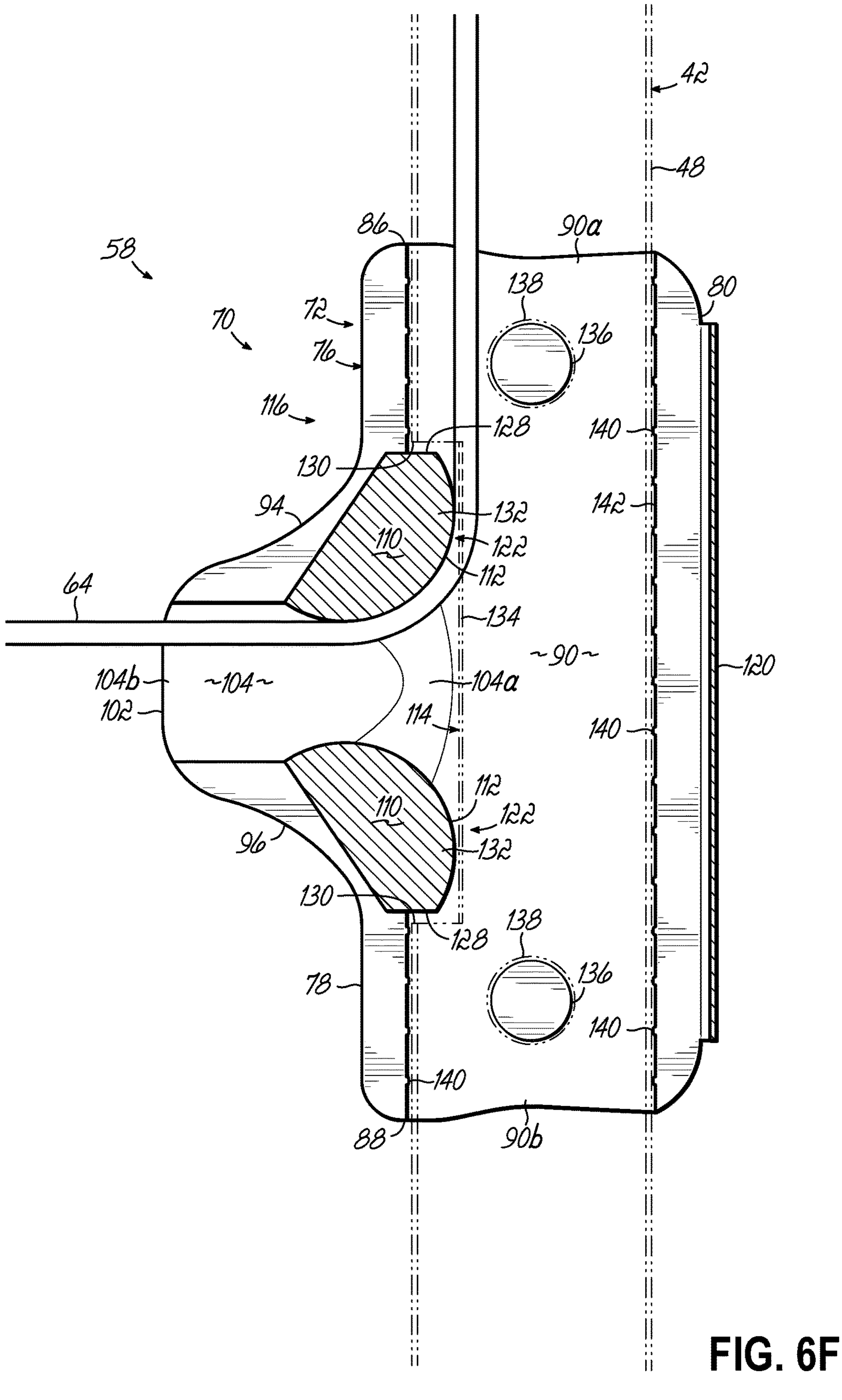
FIG. 6F is a cross-sectional view of the distribution housing shown in FIG. 6A.

As illustrated in FIGS. 4 and 5, the rack cable assembly 40 generally includes a fiber optic cable 42 that carries a plurality of optical fibers for passing data and other information through the local fiber optic network 16, and more specifically between the distribution cable 38 of a row 28 and the network equipment 18 in a rack 32 of the row 28. The number of optical fibers carried by the fiber optic cable 42 and how the optical fibers are arranged within the fiber optic cable 42 may vary based on the application. FIG. 5 illustrates one exemplary embodiment of the fiber optic cable 42. More particularly, the fiber optic cable 42 includes a plurality of subunits 44, and each subunit 44 is configured to carry a pre-selected number of optical fibers 46. Although the fiber optic cable 42 is shown as including seventy-two subunits 44, the number of subunits 44 may be more or less than this number in alternative embodiments. The plurality of subunits 44 may be arranged within an outer protective sheath 48 ("outer jacket 48"), as is generally known in the industry. As mentioned above, each of the subunits 44 is configured to carry a pre-selected number of optical fibers 46. By way of example and without limitation, in an exemplary embodiment, each subunit 44 may be configured to carry two optical fibers 46 within a subunit outer jacket 50. It should be recognized, however, that more or less optical fibers 46 may be carried by each of the subunits 44 in alternative embodiments.

In reference to FIG. 4, the rack cable assembly 40 includes the fiber optic cable 42 having a first distribution end 54, a second terminal end 56 opposite the distribution end 54, and a plurality of distribution housings 58 disposed along the length of the fiber optic cable 42 between the distribution end 54 and the terminal end 56. Although the terminal end 56 is spaced from a final distribution housing 58 in the embodiment shown, in alternative embodiments the terminal end 56 may be at (e.g., within) the final distribution housing 54. The distribution end 54 of the fiber optic cable 42 in the embodiment shown includes a furcation body and a plurality of distribution legs extending from the furcation body. Each of the distribution legs carries one or more of the optical fibers 46 within a respective jacket and includes a respective distribution connector 60 that terminates the optical fiber(s) 46. As will be explained in more detail below, the distribution connectors 60 are configured to be connected to optical interfaces or ports associated with a main patch panel in the rack 32 (which are, in turn, connected to the one or more distribution cables 38 extending along the row 28 in the cable tray 36). Any conventional, or yet to be developed, optical connector or connectorization scheme may be used in accordance with the present disclosure, including, but not limited to simplex or duplex connectors (e.g., LC connectors) and multi-fiber connectors (e.g., MPO connectors). For example, the distribution connectors 60 may include MPO (multi-fiber push on) connectors, which are configured for multi-fiber cables including multiple sub-units of optical fibers (e.g., between four to 24 optical fibers). In other embodiments, the distribution connectors 60 may be a different type of multi-fiber connector, such as an SN-MT connector commercially available from Senko Advanced Components, Inc. or an MMC connector commercially available from US Conec Ltd. In an exemplary embodiment shown in FIG. 4, there are six distribution legs and, therefore, six distribution connectors 60, with each connector 60 being configured as a 24-fiber MMC connector. As discussed above, the distribution connectors 60 may be pre-connectorized to avoid field assembly of the distribution connectors 60 to the fiber optic cable 42.

The furcation body at the distribution end 54 serves as a transition point between a main section of the fiber optic cable 62 and the distribution legs. The distribution end 54 as defined by the furcation body and distribution legs can be considered as a first end section of the fiber optic cable 62. Within the furcation body, the optical fibers 46 extend from the jackets of the distribution legs and then are re-grouped/re-organized before extending into the subunit outer jackets 50 as part of the subunits 44 carried in the main section of the fiber optic cable 62.

The distribution housings 58 of the rack cable assembly 40 are arranged at distribution points or locations 62 along the length of the main section of the fiber optic cable 42 and may be referred to as "tap housings 58"). In one embodiment, the distribution locations 62 have a distribution pattern along the fiber optic cable 42 that generally corresponds to the spacing between equipment bays in the rack 32 in which the rack cable assembly 40 is to be installed. In this way, for example, when the rack cable assembly 40 is installed in the rack 32, the distribution housings 58 are generally disposed immediately adjacent (e.g., just to the side of) respective equipment bays in the rack 32. In one embodiment, the distribution locations 62 may be uniformly spaced along the length of the fiber optic cable 42 and correspond to uniformly spaced and sized equipment bays in the rack 32. In an alternative embodiment, however, the distribution locations 62 may be non-uniformly spaced along the length of the fiber optic cable 42 and correspond to non-uniformly spaced and/or sized equipment bays in the rack 32.

The distribution housings 58 of the rack cable assembly 40 represent branch points where a subset of at least some of the plurality of optical fibers 46 being carried by the fiber optic cable 42 branch off from the main fiber optic cable 42 for connection to optical interfaces or ports in at least one of the equipment bays in the rack 32. In an exemplary embodiment, a subset of the plurality of subunits 44 may branch off from the main fiber optic cable 42 for connection to optical ports in at least one of the equipment bays in the rack 32. The subset of the plurality of subunits 44 that branch off from the main fiber optic cable 42 at the distribution housings 58 are referred to herein as tap cables 64. Each tap cable 64 extends from a distribution housing 58 of the rack cable assembly 40 for a length $L_{tap}$ and is terminated by a tap connector 66 at its end for connecting to the optical ports in at least one of the equipment bays in the rack 32. Similar to the above, any conventional, or yet to be developed, optical connector or connectorization scheme may be used in accordance with the present disclosure, including, but not limited to simplex or duplex connectors (e.g., LC connectors) and multi-fiber connectors (e.g., MPO connectors). For example, the tap connectors 66 may include MPO (multi-fiber push on) connectors, which are configured for multi-fiber cables including multiple optical fibers (e.g., between four to 24 optical fibers). In other embodiments, the tap connectors 66 may be a different type of multi-fiber connector, such as an SN-MT connector commercially available from Senko Advanced Components, Inc. or an MMC connector commercially available from US Conec Ltd. In an exemplary embodiment, each of the distribution housings 58 may include twelve tap cables 64, and each tap cable 64 may be terminated by a tap connector 66 configured as a duplex LC connector to correspond to the two optical fibers in each of the tap cables 64 extending from the distribution housing 58. As discussed above, the tap connectors 66 at the end of the tap cables 64 may be pre-connectorized to avoid field assembly of the connectors 66 to the tap cables 64.

FIGS. 6A-6F illustrate a distribution housing 58 in accordance with an embodiment of the disclosure. The distribution housing 58 includes a generally T-shaped main body 70 having a generally straight tubular portion 72 and a branch portion 74 extending from a side wall of the tubular portion 72. The tubular portion 72 includes a generally rectangular tubular body 76 having: an upper wall 78, a lower wall 80 opposite the upper wall 78, a front side wall 82 extending between the upper wall 78 and the lower wall 80, a rear side wall 84 opposite the front side wall 82 and also extending between the upper wall 78 and the lower wall 80, an inlet end wall 86 extending between the upper wall 78, the lower wall 80, the front side wall 82 and the rear side wall 84, and an outlet end wall 88 opposite the inlet end wall 82 and also extending between the upper wall 78, the lower wall 80, the front side wall 82 and the rear side wall 84. It should be appreciated that the terms "upper", "lower", "front", and "rear" are used to facilitate a full description and understanding of the distribution housings 58 and do not describe or limit the orientation of the distribution housings 58 on the rack cable assembly 40 when the rack cable assembly 40 is installed in the rack 32. Moreover, the term "inlet" connotes an end or side of the distribution housing 58 closest to the distribution end 54 of the fiber optic cable 42 and the term "outlet" connotes an end or side of the distribution housing 58 closest to the terminal end 56 of the fiber optic cable. Again, these terms are used for purposes of description and do not limit the distribution housings 58 to any particular orientation during use in the rack 32.

The tubular portion 72 includes a central passageway 90 having an inlet end 90*a* at the inlet end wall 86 and an outlet end 90*b* at the outlet end wall 88 that is configured to receive the at least some of the plurality of optical fibers 46 (e.g., plurality of subunits 44) of the fiber optic cable 42 therethrough in a generally straight-line manner. In one embodiment, the passageway 90 may have a generally circular cross-sectional profile. In an alternative embodiment, however, the passageway 90 may have a generally rectangular cross-sectional profile that is similar to the outer cross-sectional profile of the tubular body 76. It should be understood, however, that the tubular body 76 and the passageway 90 may have a wide range of shapes and profiles similar to each other or different from each other and remain within the scope of the present disclosure.

In an exemplary embodiment, the tubular portion 72 may have a length $L_t$ in a longitudinal direction of the main body portion 70, a width $W_t$ in a transverse direction of the main body 70, and a height $H_t$ in a vertical direction of the main body 70. It should be appreciated that the terms "length", "width", and "height" are used to facilitate a full description and understanding of the distribution housing 58 and do not describe or limit the orientation of the distribution housings 58 on the rack cable assembly 40 when installed in the rack 32. In one embodiment, the length $L_t$ of the tubular portion 72 may be between about 3 centimeters (cm) and about 8 cm, and the width $W_t$ and the height $H_t$ of the tubular portion 72 may be between about 30% and about 70% of the length $L_t$. Moreover, in an exemplary embodiment, the passageway 90 may have a length $L_{tp}$ in a longitudinal direction of the main body portion 70, a width $W_{tp}$ in a transverse direction of the main body 70, and a height $H_{tp}$ in a vertical direction of the main body 70. In one embodiment, the length $L_{tp}$ of the passageway 90 is substantially equal to the length $L_t$ of the tubular portion 72, and the width $W_{tp}$ and the height $H_{tp}$ of the passageway 90 may be between about 60% and about 90% of the width $W_t$ and height $H_t$ of the respective tubular portion 72, respectively. It should be appreciated, however, that different dimensions and aspect ratios for the tubular portion 72 and the passageway 90 are also possible and remain within the scope of the present disclosure.

The branch portion 74 extends from the tubular portion 72 along a central region thereof between the inlet end wall 86 and the outlet end wall 88. For purposes of description, the branch portion 74 will be described as extending from the upper wall 78 of the tubular portion 72. The branch portion 72 includes a generally rectangular tubular body 92 having an inlet end wall 94; an exit end wall 96 opposite the inlet end wall 94, a front side wall 98 extending between the inlet end wall 94 and the outlet end wall 96, a rear side wall 100 opposite the front side wall 98 and also extending between the inlet end wall 94 and the outlet end wall 96, and an upper wall 102 extending between the inlet end wall 92, the outlet end wall 94, the front side wall 98 and the rear side wall 100. Similar to the above, it should be appreciated that the terms "upper", "lower", "front", "rear", "inlet" and "outlet" are used to facilitate a full description and understanding of the distribution housings 58 and do not describe or limit the orientation of the distribution housings 58 on the rack cable assembly 40 when the rack cable assembly 40 is installed in the rack 32.

The branch portion 74 includes a central passageway 104 having a branch inlet end 104*a* and a branch outlet end 104*b*, and the central passageway 104 extends from the upper wall 102 through the tubular body 92 so as to be in communication with the passageway 90 in the tubular portion 72. The central passageway 104 of the branch portion 74 is configured to receive the branched off tap cables 64 from the main fiber optic cable 42 extending through the tubular portion 72. In one embodiment, the passageway 104 may have a generally circular cross-sectional profile. In an alternative embodiment, however, the passageway 104 may have a generally rectangular cross-sectional profile that is similar to the outer cross-sectional profile of the tubular body 92. It should be understood, however, that the tubular body 92 and the passageway 104 may have a wide range of shapes and profiles similar to each other or different from each other and remain within the scope of the present disclosure.

The branch portion 74 has a length $L_b$ in a longitudinal direction of the main body portion 70, a width $W_b$ in a transverse direction of the main body 70, and a height $H_b$ in a vertical direction of the main body 70. In an exemplary embodiment, the width $W_b$ of the branch portion 74 may be substantially equal to the width $W_t$ of the tubular portion 72. In this way, the branch portion 74 merges smoothly with the tubular portion 72 in the width direction to prevent catch or snag points associated with the distribution housing 58. In this exemplary embodiment, the length $L_b$ of the branch portion 74 and the height $H_b$ of the branch portion 74 may be about equal to the width $W_b$ dimension. Moreover, in an exemplary embodiment, the passageway 104 may have a length $L_{bp}$ in a longitudinal direction of the main body portion 70, a width $W_{bp}$ in a transverse direction of the main body 70, and a height $H_{bp}$ in a vertical direction of the main body 70. In one embodiment, the length $L_{bp}$ and the width $W_{bp}$ of the passageway 104 may be between about 60% and about 90% of the length $L_b$ and width $W_b$ of the respective branch portion 74, respectively, and the height $H_{bp}$ of the passageway 104 may be substantially equal to the height $H_b$ of the branch portion 74. It should be appreciated, however, that different dimensions and aspect ratios for the branch portion 74 and the passageway 104 are also possible and remain within the scope of the present disclosure.

In an exemplary embodiment, the branch portion 74 extends from the tubular portion 72 in a substantially perpendicular manner (i.e., 90°±5°) such that the passageway 90 in the tubular portion 72 and the passageway 104 in the branch portion 74 intersect in a substantially perpendicular manner. In alternative embodiments, however, the branch portion 74 may extend from the tubular portion 72 at other angles. For example, in one alternative embodiment, as will be discussed below, the branch portion 74 may extend from the tubular portion 72 at an obtuse angle, such as between about 120° and about 150°, relative to the inlet side of the distribution housing 58. Thus, aspects of the disclosure should not be limited to the perpendicular configuration between the tubular portion 72 and the branch portion 74 as shown in the figures and described above.

The distribution housing 58 may include additional internal features that facilitate the branching off of the tap cables 64 from the main fiber optic cable 42. For example, when branching optical fibers from a main line or direction, care must be taken to prevent excessive bending beyond a threshold level in order to prevent damage (e.g., breakage) of the optical fibers or inducing excessive bending stresses that increase optical losses through the optical fibers. For this reason, the distribution housing 58 may include bend-limiting features for the tap cables 64 being branched off from the main fiber optic cable 42. More particularly, adjacent the intersection of the passageway 90 in the tubular portion 72 and the passageway 104 in the branch portion 74, the main body 70 may include at least one mandrel 110 characterized by an outer arcuate surface 112. The at least one mandrel 110, and more particularly the arcuate surface 112 thereof, is configured to engage with the branched off tap cables 64 and limit bending of the optical fibers 46 to a level below the threshold indicative of damage to or reduced performance of the optical fibers 46. In other words, the arcuate surface 112 of the at least one mandrel 110 limits the bending radius of the tap cables 64 being branched off from the main fiber optic cable 42. By way of example and without limitation, the arcuate surface 112 of the at least one mandrel 110 may have a radius of curvature of about 7.5 mm or greater, or between about 7.5 mm and about 10 mm to limit the bending of the tap cables 64 being branched off of the main fiber optic cable 42. Other values may also be possible.

In an exemplary embodiment, the distribution housing 58 includes two mandrels 110 adjacent the intersection of the passageway 90 in the tubular portion 72 and the passageway 104 in the branch portion 74. From the perspective of the tubular body 72, one mandrel 110 is located on the inlet side of the intersection of passageways 90, 104, and the other mandrel 110 is located on the outlet side of the intersection of the passageways 90, 104. The inclusion of two mandrels 110 provides the distribution housing 58 with a bidirectional feature that allows the distribution housing 58 to be connected to the fiber optic cable 42 in two different orientations but provide the same functionality. For example, imagine an embodiment where there is only one mandrel 110 associated with the distribution housing 58 (not shown). When the distribution housing 58 is connected to the fiber optic cable 42, then manufacturers would have to ensure that the mandrel 110 is located on the inlet side of the intersection of passageways 90, 104. Should a manufacturer or technician connect the distribution housing 58 to the fiber optic cable 42 in an inverted configuration, then the (single) mandrel 110 will be located only on the outlet side of the intersection of passageways 90, 104. Such an arrangement, however, would not limit the bending of the tap cables 64 being branched off the main fiber optic cable 42 at the distribution housing 58. Thus, the optical fibers 46 of the tap cables 64 may be damaged or broken during manufacturing, installation, and/or use of the rack cable assembly 40. Such a distribution housing would be unidirectional in its connection to the fiber optic cable and care must be taken when connecting such a unidirectional distribution housing to the fiber optic cable.

In contrast to this, however, if two mandrels 110 are included in the distribution housing 58 as described above, then no matter what orientation the distribution housing 58 is connected to the fiber optic cable 42, a mandrel 110 will always be located on the inlet side of the intersection of passageways 90, 104 (and also on the outlet side of the intersection of passageways 90, 104) to thereby prevent overbending of the tap cables 64 being branched off the main fiber optic cable 42 at the distribution housing 58. Thus, by including two mandrels 110, a symmetry is provided to the distribution housing 58 that allows bidirectional connection of the distribution housing 58 to the fiber optic cable 42.

In one aspect of the disclosure, the distribution housings 58 of the rack cable assembly 40 may be configured to be attached to the fiber optic cable 42 in a separate processing step during the manufacture of the rack cable assembly 40. In other words, the fiber optic cable 42 with a plurality of distribution locations 62 and tap cables 64 with connectors 66 may be arranged prior to the attachment of the distribution housings 58 to the fiber optic cable 42. The '762 publication, referenced above, is particularly informative on example ways in which a rack cable assembly 40 according to this disclosure may be prepared prior to the attachment of the distribution housings 58. The fiber optic cable 42 shown, like those disclosed in the '762 publication, includes an elongate opening or slot 114 through the outer jacket 48 of the main fiber optic cable 42 at the distribution locations 62. This allows the branched off tap cables 64 (e.g., subunits 44) to extend away from the fiber optic cable 42. An example method of arranging the plurality subunits 44 through the outer jacket 48 of fiber optic cable 42 and through the slots 114 at the distribution locations 62 of the fiber optic cable 42 is discussed in detail in the '762 publication and thus will not be repeated here for sake of brevity.

In one embodiment, to allow the distribution housings 58 to be attached to the rack cable assembly 40 after the fiber optic cable 42, subunits 44, and tap cables 64 have been arranged, the distribution housings 58 may have a clam-shell configuration. The clam-shell configuration allows the distribution housings 58 to close around the fiber optic cable 42 and tap cables 64 at the distribution locations 62. As illustrated in FIGS. 6A-8B, in this embodiment, the distribution housing 58 may include a first half shell 116 and a second half shell 118 connectable to each other to form the distribution housing 58. In one embodiment, the so-called "split line" between the half shells may be vertically arranged so as to extend centrally through the upper wall 78 and the lower wall 80 of the tubular portion 72 and centrally through the branch portion 74. Thus, each of the first half shell 116 and the second half shell 118 may include part of the tubular portion 72 and part of the branch portion 74 as illustrated in the figures.

In one embodiment, the first and second half shells 116, 118 may be connected by a pivot or hinge 120 that allows the half shells 116, 118 to move or rotate relative to each other between an opened position and a closed position. In the opened position, the fiber optic cable 42 and tap cables 64 may be received in the distribution housing 58 and positioned along their appropriate passageways 90, 104. Then the half shells 116, 118 may be rotated to the closed position to enclose the fiber optic cable 42 and tap cables 64 within the distribution housing 58 such that the fiber optic cable 42 extends through the passageway 90 of the tubular portion 72 and the tap cables 64 extend through the passageway 104 of the branch portion 74. In one embodiment, the hinge 120 may be a living hinge formed by a flexible flap between the two half shells 116, 118. Other types of hinges or pivot mechanisms, however, may be possible to allow the half shells 116, 118 to move relative to each other between opened and closed positions.

Figure 7:
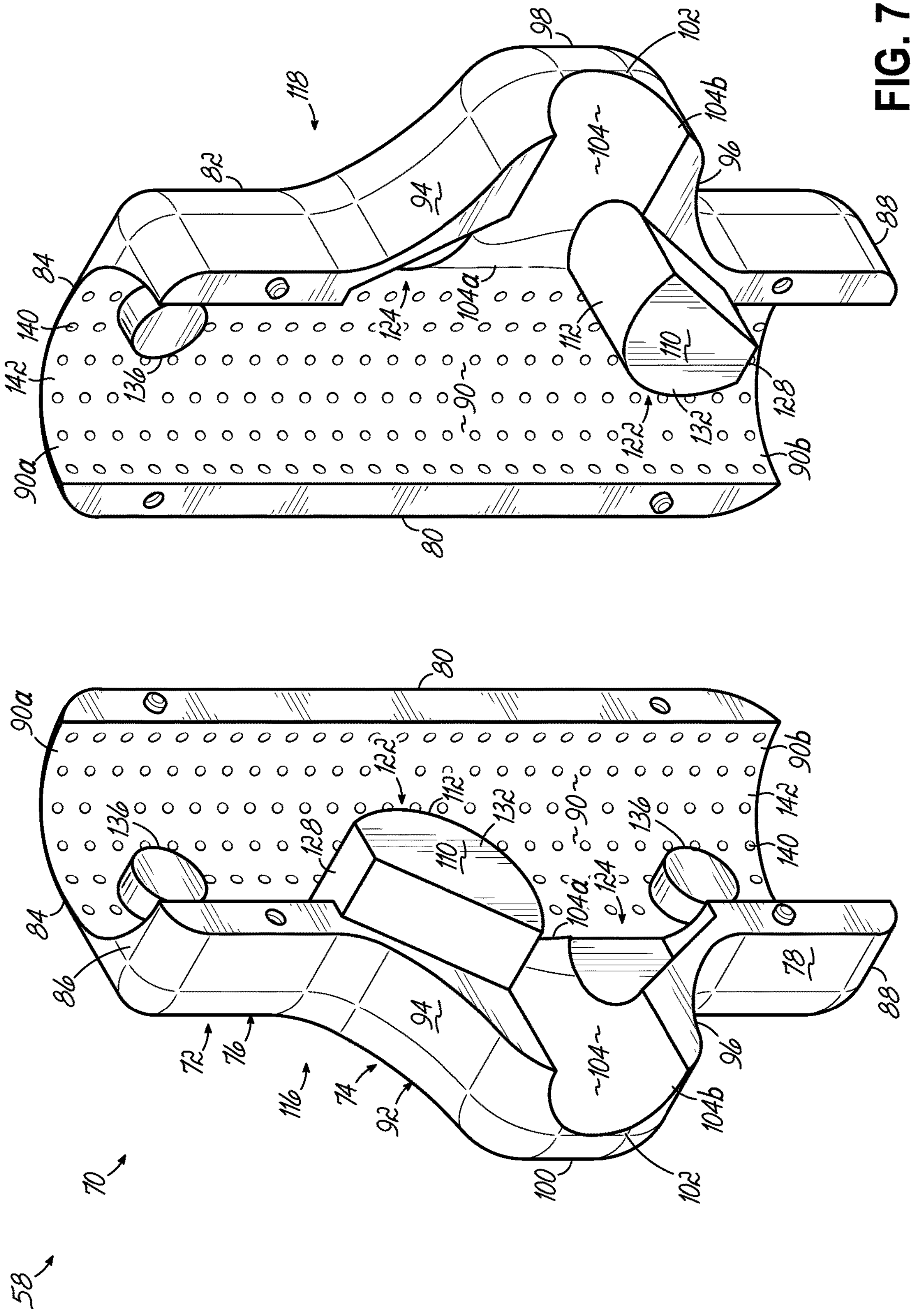
FIG. 7 is a perspective view of a distribution housing for the fiber optic cable assembly according to another embodiment of the disclosure.

In one embodiment, and as illustrated in FIG. 7, each of the first half shell 116 and second half shell 118 may include a projection 122 and a pocket 124 adjacent the intersection of the passageway 90 and passageway 104. The projection 122 is configured to form the mandrel 110 and the pocket 124 is configured to receive the projection 122. The projection 122 and pocket 124 on the first half shell 116 and the second half shell 118 may be inverted such that the projection 122 on one half shell 116, 118 is received in the pocket 124 of the other half shell 118, 116. In this way, when the first half shell 116 and the second half shell 118 are brought together in the closed position, mandrels 110 are formed on both the inlet side and the outlet side at the intersection of passageways 90, 104, as was described above. In an alternative embodiment (not shown), however, instead of each half shell 116, 118 having a projection 122 and a pocket 124, the first half shell 116 may include a pair of projections 122 or a pair of pockets 124, and the second half shell 118 may include a pair of pockets 124 or a pair of projections 122, respectively. In a further alternative embodiment, should only one mandrel 110 be required in the distribution housing 58, then only one projection 122 and one pocket 124 may be provided on the inlet side of the first and second half shells 116, 118. In any event, the arrangement of projections 122 and pockets 124 on the various half shells 116, 118 may be configured to provide at least one mandrel 110 on the inlet side of the intersection of the passageways 90, 104, and preferably a pair of mandrels 110 on both the inlet and outlet sides of the intersection of the passageways 90, 104 to thereby provide the bidirectionality feature to the distribution housing 58 described above.

Because the distribution housings 58 are separately formed and then connected to the fiber optic cable 42 in a latter processing step, it may be important to limit movement of the distribution housings 58 relative to the fiber optic cable 42 after attachment. Thus, for example, the distribution housings 58 may include one or more movement restrictors configured to limit displacements and/or rotational movements of the distribution housings 58 relative to the fiber optic cable 42 when in the closed position. In one embodiment, the at least one mandrel 110 of a distribution housing 58 may include a first abutment shoulder 128 configured to engage with a first edge 130 of the slot 114 in the fiber optic cable 42 to limit movement of the distribution housing 58 relative to the fiber optic cable 42. In this embodiment, for example, the slot 114 is sized such that when the first and second half shells 116, 118 are in the closed position about the fiber optic cable 42, the at least one mandrel 110 extends within the slot 114 such that the first abutment shoulder 128 is in near contact with the first edge 130 of the slot 114. Thus, when the displacement housing 58 is subjected to a displacement relative to the fiber optic cable 42, e.g., toward the inlet side of the distribution housing 58 (one-way longitudinal displacement), the first abutment shoulder 128 on the mandrel 110 engages with the first edge 130 of the slot 114 to limit the displacement in that longitudinal direction.

In the embodiment where there are two mandrels 110 on both the inlet and outlet sides of the intersection between the passageways 90, 104, each mandrel 110 may extend within the slot 114 of the fiber optic cable 42 and each mandrel 110 may include an abutment shoulder 128 in near contact with respective first edges 130 of the slot 114. In this way, when the displacement housing 58 is subjected to a displacement relative to the fiber optic cable 42, either toward the inlet side or the outlet side of the distribution housing 58 (two-way longitudinal displacement), one of the first abutment shoulders 128 on one of the mandrels 110 engages with one of the respective first edges 130 of the slot 114 to limit the displacement in the respective longitudinal direction.

In addition to longitudinal displacements, contact between the at least one mandrel 110 and the slot 114 may also limit rotational movements of the displacement housing 58 relative to the fiber optic cable 42. For example, in one embodiment, the at least one mandrel 110 of the distribution housing 58 may include a pair of second abutment shoulders 132 configured to engage with a respective pair of second edges 134 of the slot 114 to limit rotational movements of the distribution housing 58 relative to the fiber optic cable 42. As noted above, the slot 114 may be sized such that when the first and second half shells 116, 118 are in the closed position about the fiber optic cable 42, the at least one mandrel 110 may extend within the slot 114 such that the pair of second abutment shoulders 130 are in near contact with the respective pair of second edges 134 of the slot 114. Thus, when the distribution housing 58 is subjected to a rotation relative to the fiber optic cable 42 in, for example, a clockwise direction, one of the pair of second abutment shoulders 132 on the at least one mandrel 110 engages with its respective side edge 134 of the slot 114 to limit rotation in that clockwise direction. If the distribution housing 58 is rotated in the counter-clockwise direction relative to the fiber optic cable 42, then the other of the pair of second abutment shoulders 132 on the at least one mandrel 110 engages with its respective side edge 134 of the slot 114 to limit rotation in that counter-clockwise direction.

In the embodiment where there are two mandrels 110 on both the inlet and outlet sides of the intersection of the passageways 90, 194, each mandrel 110 may extend within the slot 114 and each mandrel 110 may include a pair of abutment shoulders 132 in near contact with a respective pair of second edges 134 of the slot 114. In this way, when the displacement housing 58 is subjected to a rotation relative to the fiber optic cable 42 in either the clockwise or counter-clockwise direction (two-way rotation), multiple points of engagement are made to limit rotation in these respective directions.

In another embodiment, the distribution housings 58 may include a second movement restrictor configured to limit displacements and/or rotational movements of the distribution housings 58 relative to the fiber optic cable 42 when in the closed position. In this embodiment, the displacement housing 58 may include at least one lock pin 136 and the fiber optic cable 42 may include at least one lock receiver 138. When the first and second half shells 116, 118 of the distribution housing 58 are in the closed position, the at least one lock pin 136 on the distribution housing 58 may be received in the at least one lock receiver 138 in the fiber optic cable 42 to limit relative movements therebetween. In one embodiment, the at least one lock pin 136 may include a post extending into the passageway 90 of the tubular portion 72 of the main body 70, and the at least one lock receiver 138 may be an opening formed through the outer jacket 48 of the fiber optic cable 42. In an exemplary embodiment, the distribution housing 58 may include a plurality of lock pins 136 and the fiber optic cable 42 may include a corresponding number of lock receivers 138. By way of example and without limitation, the distribution housing 58 and fiber optic cable 42 may include four lock pin/lock receiver pairs, but more or less pairs are possible. In one embodiment, and as illustrated in the figures, each of the first half shell 116 and the second half shell 118 may include two lock pins 136 that are configured to be received in respective lock receivers 138 on opposed sides of the outer jacket 48 of the fiber optic cable 42. The lock pins 136 may be rotationally offset (e.g., by about 90°) from the branch portion 74 and may be positioned in the passageway 90 adjacent the inlet end 90*a* and the outlet end 90*b*.

As discussed above, the at least one lock pin 136 may be configured to be received in the at least one lock receiver 138 to prevent relative movement between the distribution housing 58 and the fiber optic cable 42. For example, the at least one lock pin 136 may have a cross-sectional profile that matches the profile of the at least one lock receiver 138 in the outer jacket 48 of the fiber optic cable 42. In one embodiment, for example, the lock pin 136 and the lock receiver 138 may both have a circular profile. Other profiles, such as rectangular, triangular, or other polygonal shapes may also be possible. When the distribution housing 58 is subjected to a displacement relative to the fiber optic cable 42 in the longitudinal direction, the at least one lock pin 136 immediately engages with the at least one lock receiver 138 to limit (two-way) longitudinal displacements. In a similar manner, when the distribution housing 58 is subjected to a rotation relative to the fiber optic cable 42 in either a clockwise direction or a counter-clockwise direction, the at least one lock pin 136 immediately engages with the at least one lock receiver 138 to limit (two-way) rotations. Thus, once the distribution housing 58 is in the closed position, the lock pin 136/lock receiver 138 pairings are effective to limit displacements and/or rotations of the distribution housing 58 relative to the fiber optic cable 42.

In a further embodiment, the distribution housings 58 may include a third movement restrictor configured to limit displacements and/or rotational movements of the distribution housings 58 relative to the fiber optic cable 42 when in the closed position. In this embodiment, the displacement housing 58 may include friction-enhancing elements 140 configured to increase the friction between the distribution housing 58 and the outer jacket 48 of the fiber optic cable 42. More particularly, in this embodiment, the inner wall 142 that forms the passageway 90 of the tubular portion 72 of the main body 70 of the distribution housing 58 may include the friction-enhancing elements 140. The friction-enhancing elements 140 may include raised dimples, ridges/valleys, tentacles, and/or other irregularities that increase surface roughness and friction. In one embodiment, the friction-enhancing elements 140 may be integrally formed with the distribution housing 58, such as during molding of the distribution housing 58. Alternatively, the friction-enhancing elements 140 may be subsequently formed, such as by various coating processes or other surface treatments that increase friction.

After the first half shell 116 and the second half shell 118 are moved to the closed position about the fiber optic cable 42, it may be undesirable to have the half shells 116, 118 come apart and move back to the opened position. Thus, in a further embodiment, the first and second half shells 116, 118 may be permanently or selectively coupled together to prevent unintentional movement of the half shells 116, 118 away from the closed position. By way of example and without limitation, the first and second half shells 116, 118 may be coupled together through a relatively high friction press fit that prevents the half shells 116, 118 from moving away from their closed position. For example, the projections 122 and the pockets 124 may engage through a frictional press fit that maintains the half shells 122, 124 in the closed position. In another example, the half shells 116, 118 may be sonically welded together at discrete locations to maintain the half shells 122, 124 in the closed position. In yet another embodiment, the half shells 122, 124 may be adhesively bonded together in the closed position. While this embodiment is a less preferred embodiment, the use of adhesives to maintain the half shells 116, 118 in the closed position remains an option. In addition to or alternate to one or more of the securing means described above, the distribution housing 58 may include one or more latches to maintain the first and second half shells 116, 118 in the closed position. Additional details of one such latch is described more fully below in reference to FIGS. 8A and 8B.

In one embodiment, the distribution housings 58 may be formed from a rigid plastic material, such as rigid engineering plastics. By way of example and without limitation, the distribution housings 58 may be made from polyethylene, acrylonitrile butadiene styrene, polypropylene, and other suitable plastics. As noted above, the distribution housings 58 may be configured to be formed separately and then attached to the fiber optic cable 42 to form the fiber optic cable assembly 40. In one embodiment, the distribution housings 58 may be injection molded bodies. For example, the first half shell 116, second half shell 118, and living hinge 120 may be formed in a single shot injection mold process, which is time and cost efficient from a manufacturing perspective. It should be appreciated, however, that the molding process described above is merely exemplary and there may be other processes for forming the distribution housings 58 that is within the skill of the ordinary artisan in the molding arts. Molding processes are generally well known and a more detailed description of various molding processes will be omitted.

Figure 8A:
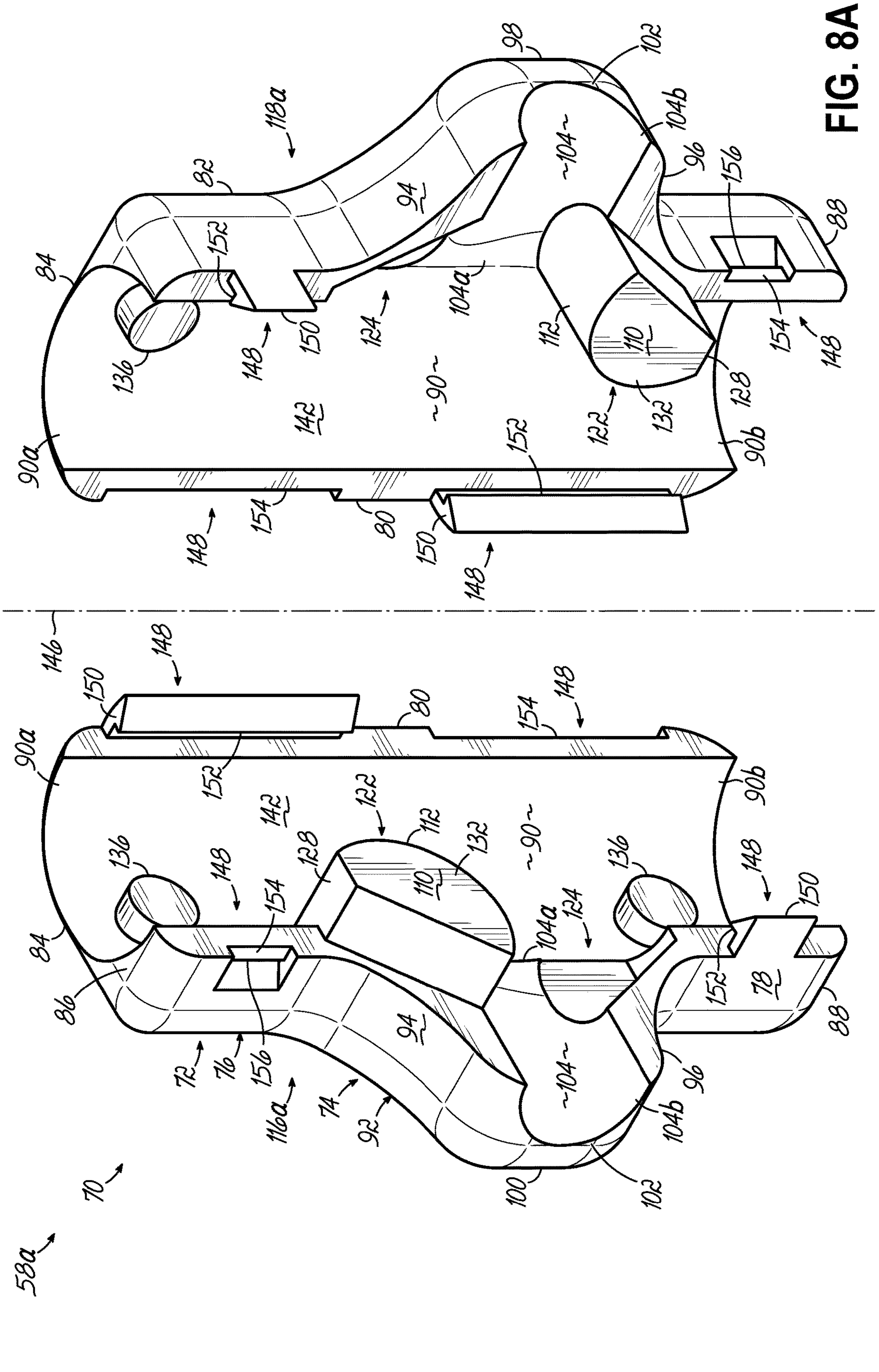
FIG. 8A is a perspective view of a distribution housing similar to that shown in FIG. 7 illustrating latches and in the opened position.
Figure 8B:
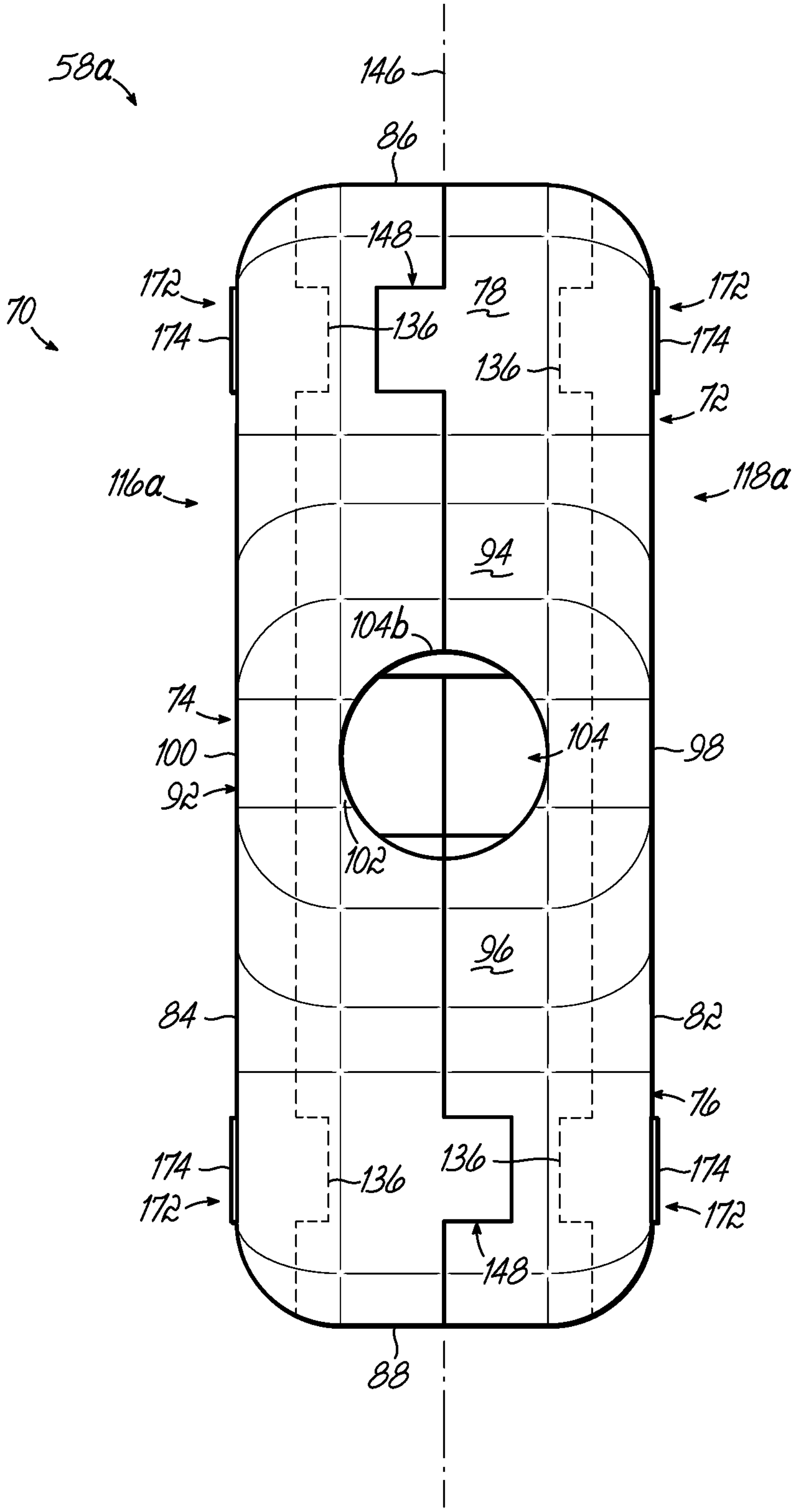
FIG. 8B illustrates the distribution housing shown in FIG. 8A but in the closed position.

FIGS. 8A and 8B illustrate a distribution housing 58*a* in accordance with another embodiment of the disclosure. In these figures, various features of the distribution housing 58*a* may be similar to features described above in reference to distribution housing 58. Like features will therefore have like reference numbers. Distribution housing 58*a* has similar features and operates in much the same way as distribution housing 58, and thus only primary differences between the two embodiments will be described in detail. Similar to the above, the distribution housing 58*a* is formed from a first half shell 116*a* and a second half shell 118*a* that are connected together to form the distribution housing 58*a*. One difference of this embodiment relative to that described above relates to manufacturing efficiency created by certain symmetries/asymmetries of the half shells 116*a*, 118*a*. More particularly, the half shells 116*a*, 118*a* are configured such that they are identical to each other. From a manufacturing perspective, this means that only one type of part needs to be manufactured. For example, should the half shells 116*a*, 118*a* be molded parts, only one part (i.e., only one half shell) needs to be molded. This reduction in parts provides manufacturing and cost advantages.

In this embodiment, to form the distribution housing 58*a*, one would take one of the two identical half shells 116*a*, take the other of the identical half shells 118*a*, and orient both half shells 116*a*, 118*a* relative to each other so as to have the branch portions 74 pointing in the same direction and the interior side of the half shells 116*a*, 118*a* facing each other. The half shells 116*a*, 118*a* may then be brought together to connect the two half shells to each other and thereby form the distribution housing 58*a*. To provide this "one-part" configuration, there is an asymmetry in the projection 122/pocket 124 arrangement for the half shells 116*a*, 118*a*. More particularly, in this embodiment, each half shell 116*a*, 118*a* includes a projection 122 and a pocket 124 on opposed sides of the intersection between the passageways 90, 104. Thus, if the half shells 116*a*, 118*a* were reflected across a plane that includes an axis of the central passageway 104 and which plane intersects the axis of the central passageway 90, the projections 122 would be received in the pocket 124. This plane is referred to herein as the reflection plane 146.

Moreover, in this embodiment, should the distribution housing 58*a* include one or more lock pins 136 configured to engage corresponding lock receivers 138 in the fiber optic cable 42, those lock pins 136 should be provided in a symmetric manner across the reflection plane 146. Thus, if the half shells 116*a*, 118*a* were reflected across the reflection plane 146, the lock pins 136 would align with each other.

As illustrated in the figures, the distribution housing 58*a* may include at least one latch to connect the half shells 116*a*, 118*a* together. In one embodiment, the distribution housing 58*a* may include a plurality of latches, for example, one latch 148 being disposed adjacent the upper wall 78 of the tubular portion 72 and one latch 148 being disposed adjacent the lower wall 80 of the tubular portion 72, as illustrated in the FIG. 2. In one embodiment, each latch 148 may include a cantilevered tongue 150 having an abutment surface 152, and a catch 154 also having a corresponding abutment surface 156. In the closed position of the half shells 116*a*, 118*a*, the catch 154 is configured to receive the tongue 150 in, for example, a snap-fit manner such that the abutment surfaces 152, 156 engage each other. To provide the "one-part" configuration of the half shells 116*a*, 118*a*, there is an asymmetry in the tongue 150/catch 154 arrangement. More particularly, in this embodiment, each half shell 116*a*, 118*a* may include a first tongue 150 and a first catch 154 on opposed sides of the reflection plane 146. Additionally, each half shell 116*a*, 118*a* may also include a second tongue 150 and a second catch 154 on opposed sides of the reflection plane 146. Thus, if the distribution housing 58*a* were reflected across the reflection plane 146, the tongues 150 would be respectively received in the catches 154. By using the at least one latch 148, the need to connect the half shells 116*a*, 118*a* using adhesives. sonic welding, or other types of less desirable securing means may be avoided.

The connection of the distribution housing 58*a* to the fiber optic cable 42 is similar to that described above for distribution housing 58. However, instead of the two half shells 116*a*, 118*a* being connected by a hinge 120, and pivotably closing around the fiber optic cable 42 and the tap cables 64, the fiber optic cable 42 and tap cables 64 may be positioned in the passageway 90 and passageway 104, respectively, of one of the half shells 116*a*, the other half shell 118*a* may be properly oriented relative to the half shell 116*a*, and then the half shells 116*a*, 118*a* may be brought together until the at least one latch 148 connects the two half shells 116*a*, 118*a* together. Additionally, although not shown, in a further embodiment it should be understood that the half shells 116*a*, 118*a* may include friction-enhancing elements 140 on the inner wall 142 that forms the passageway 90 of the distribution housing 58*a*. As discussed above, the friction-enhancing elements 140 increase the friction between the distribution housing 58*a* and the outer jacket 48 of the fiber optic cable 42 to limit displacements and/or rotational movements of the distribution housing 58*a* relative to the fiber optic cable 42.

Figure 9:
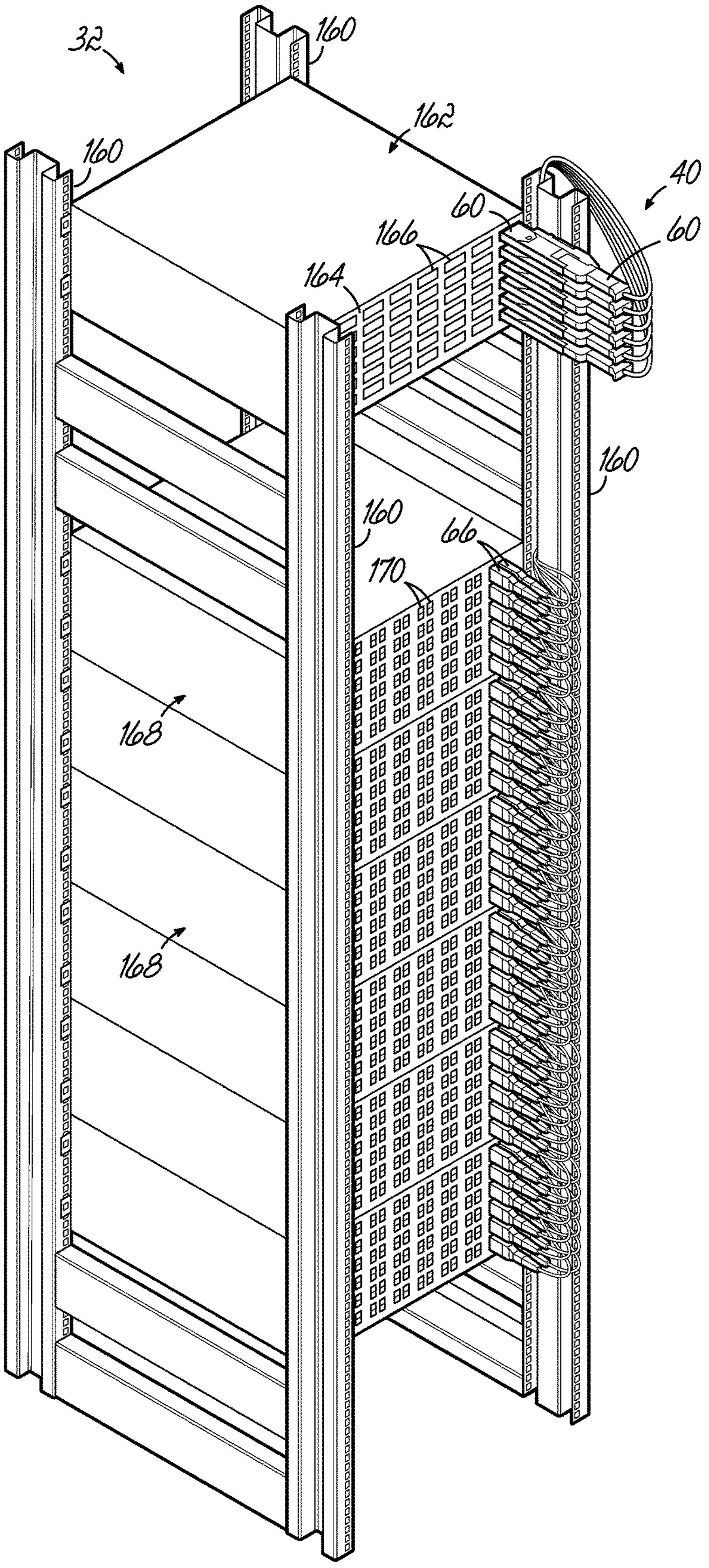
FIG. 9 illustrates a rack with the fiber optic cable assembly pre-installed in the rack.

FIG. 9 illustrates the rack cable assembly 40 installed in a rack 32, such as in a row 28 of a data hall 26 of a data center 10. The rack 32 has a generally known construction and includes a plurality of vertical rails 160 that provide a framework for the rack 32. In an exemplary embodiment, the rack 32 includes a main patch panel 162 near a top of the rack 32 that is configured to be connected to the distribution cables 38 extending along the row 28 in the overhead cable trays 36. More particularly, the main patch panel 162 may include a rear interface (not shown) defining a plurality of connector interfaces or rear ports for making connections with the distribution cable 38. The main patch panel 162 further includes a front interface 164 defining a plurality of front ports 166. The rack cable assembly 40 is configured to connect the network equipment 18 mounted in the rack 32 to the front ports 166 of the main patch panel 162. In this regard, the rack 32 typically includes a plurality of equipment bays 168 for receiving the network equipment 18 therein and securing the network equipment 18 to the rails 160 of the rack 32. In one embodiment, for example, the rack 32 may include six equipment bays 168; however, the number may vary depending on the rack architecture. The network equipment 18 in each equipment bay 168 typically includes a plurality of ports 170 configured to be connected to the front interface 164 of the main patch panel 162. The rack cable assembly 40 achieves that connection in a highly organized manner and in a plug-and-play manner, as described in more detail below.

The plug-and-play capability may be provided by pre-installing the network equipment 18 into the equipment bays 168 in the rack 32. The rack cable assembly 40 may then be pre-installed in the rack 32. For example, the distribution connectors 60 at the distribution end 54 of the rack cable assembly 40 may be connected to designated, respective front ports 166 on the front interface 164 of the main patch panel 162 near the top of the rack 32. The rack cable assembly 40 may then be routed along one of the vertical rails 160 of the rack 32. As noted above, the spacing between the distribution housings 58 along the rack cable assembly 40 is configured to match the spacing between the equipment bays 168 in the rack 32 such that a distribution housing 58, 58*a* is positioned immediately adjacent to a respective one of the equipment bays 168 in the rack 32. In one embodiment, each equipment bay 168 in the rack 32 includes a distribution housing 58, 58*a* immediately to a side of the equipment bay 168. For example, in one embodiment, the distribution housing 58, 58*a* is within a distance no greater than about 10 cm to about 20 cm from a side of the equipment bay 168. It should be appreciated, however, that distances greater than or less than this range may be possible.

In one embodiment, the tap cables 64 extending from each of the branch portions 74 of the distribution housings 58, 58*a* are configured to be connected to network equipment 18 in its associated equipment bay 128. Such a configuration provides that the length $L_{tap}$ of the tap cables 64 remains relative short, and thereby provides a clean and organized arrangement of the cabling in the rack 32. For example, in one embodiment, the length $L_{tap}$ of the tap cables 64 extending from the distribution housings 58, 58*a* may be no longer than 30 cm to about 60 cm. In any event, positioning the distribution housings 58, 58*a* immediately adjacent to their respective equipment bays 168 also simplifies the connection of the tap connectors 66 to the ports 170 from the network equipment 18 in the respective equipment bays 168. With the connection of the tap connectors 66 to the ports 170 associated with the network equipment 18 in the equipment bays 168, the network equipment 18 is optically connected to the main patch panel 162 near the top of the rack. Thus, all that remains for operability of the rack 32 is to connect the main patch panel 162 to a distribution cable 38 and connect the rack 32 to a power source. These two steps are achieved when the rack 32 is delivered to its installation location, such as at a data center 10.

Figure 10:
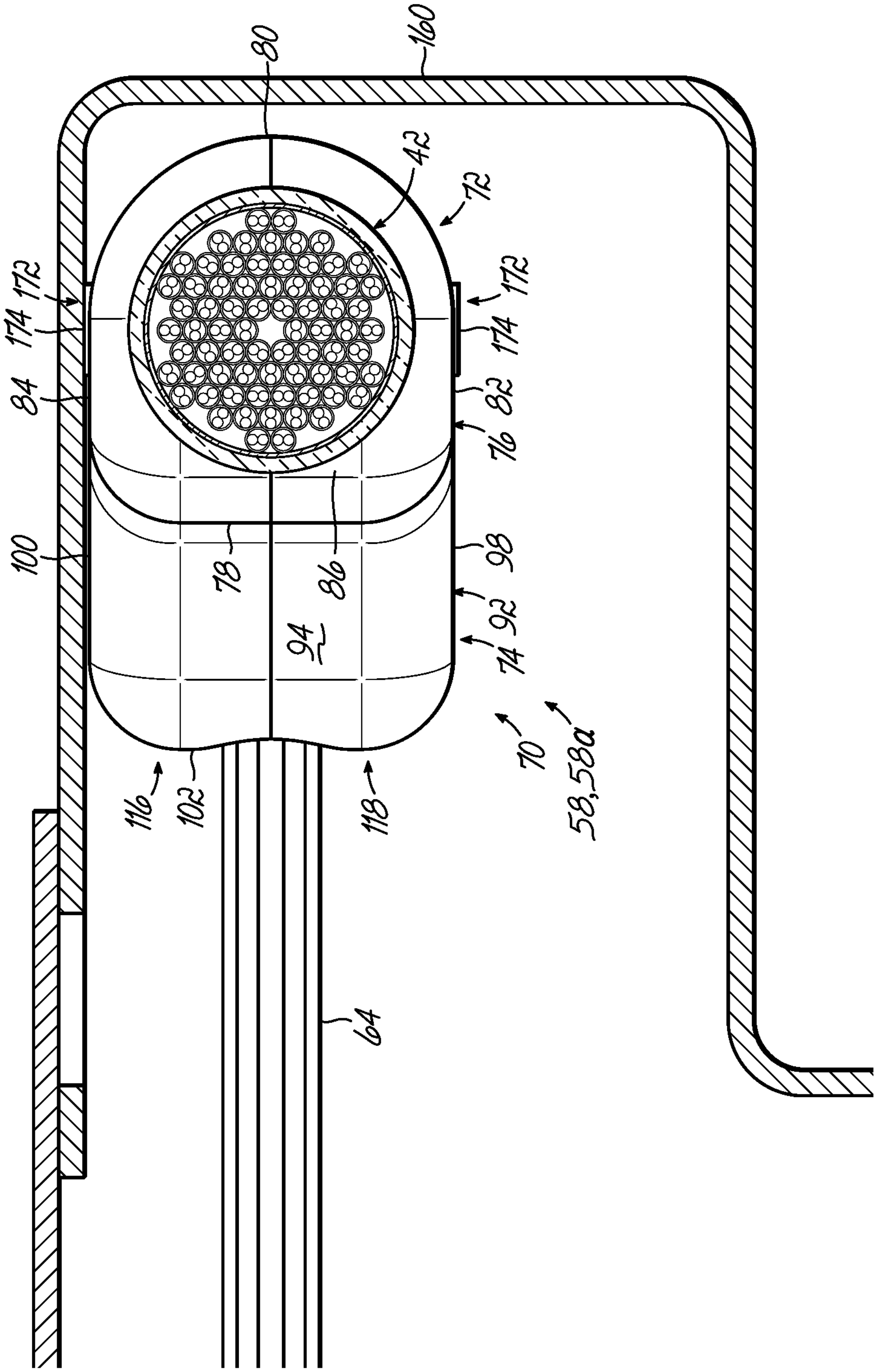
FIG. 10 is a cross-sectional view illustrating a connection means between a distribution housing on the fiber optic cable assembly and the rack according to one embodiment of the disclosure.

To maintain the position of the rack cable assembly 40 in the rack 32, at least one of the distribution housings 58, 58*a* may be secured to the rack 32 through a connection means 172. In an exemplary embodiment, a plurality of the distribution housings 58, 58*a* of the rack cable assembly 40 may be secured to the rack 32 by connection means 172. By way of example, and without limitation, in one embodiment, the connection means 172 may include at least one magnet 174. As illustrated in FIG. 10, at least one of the distribution housings 58, 58*a* may include at least one magnet 174 on one or both of the front side wall 82 and the rear side wall 84 of the tubular portion 72 of the distribution housing 58, 58*a*. In an exemplary embodiment, each of the front side wall 82 and the rear side wall 84 may include a pair of magnets 174 to secure the distribution housing 58, 58*a* to the rack 32. It should be realized, however, that in alternative embodiments the at least one magnet 174 may include more than two magnets 174 and/or the at least one magnet 174 may be included on other walls of the tubular portion 72, such as the lower wall 80, depending on the desired position of the rack cable assembly 40 in the rack 32. The magnets may simply be attached to the outer surface of the distribution housings 58, 58*a* or may be embedded in the material that forms the distribution housings 58, 58*a*

Figure 11A:
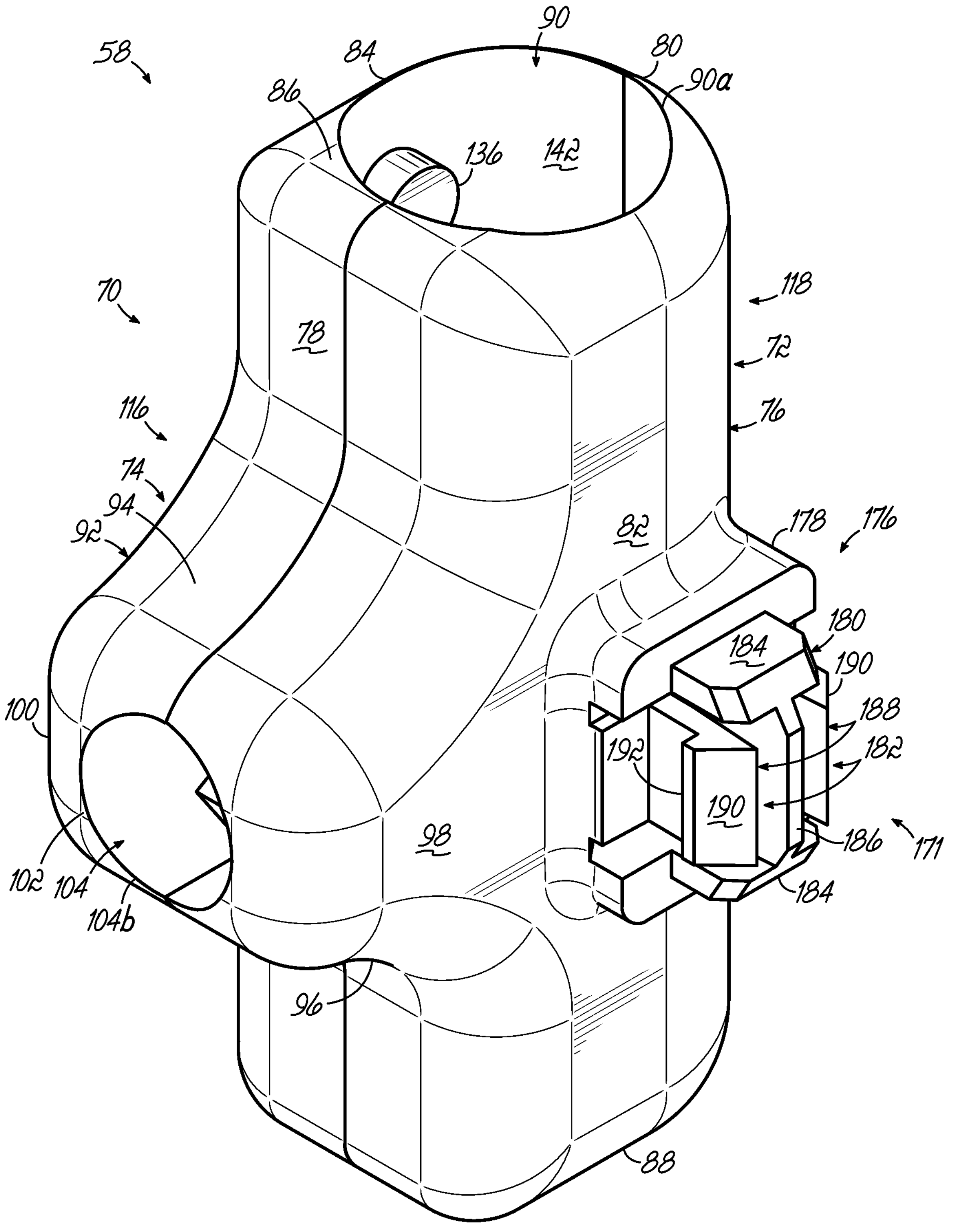
FIGS. 11A-11C illustrate an alternative connection means for a distribution housing on the fiber optic cable assembly and the attachment of the distribution housing to the rack using the connection means.
Figure 11B:
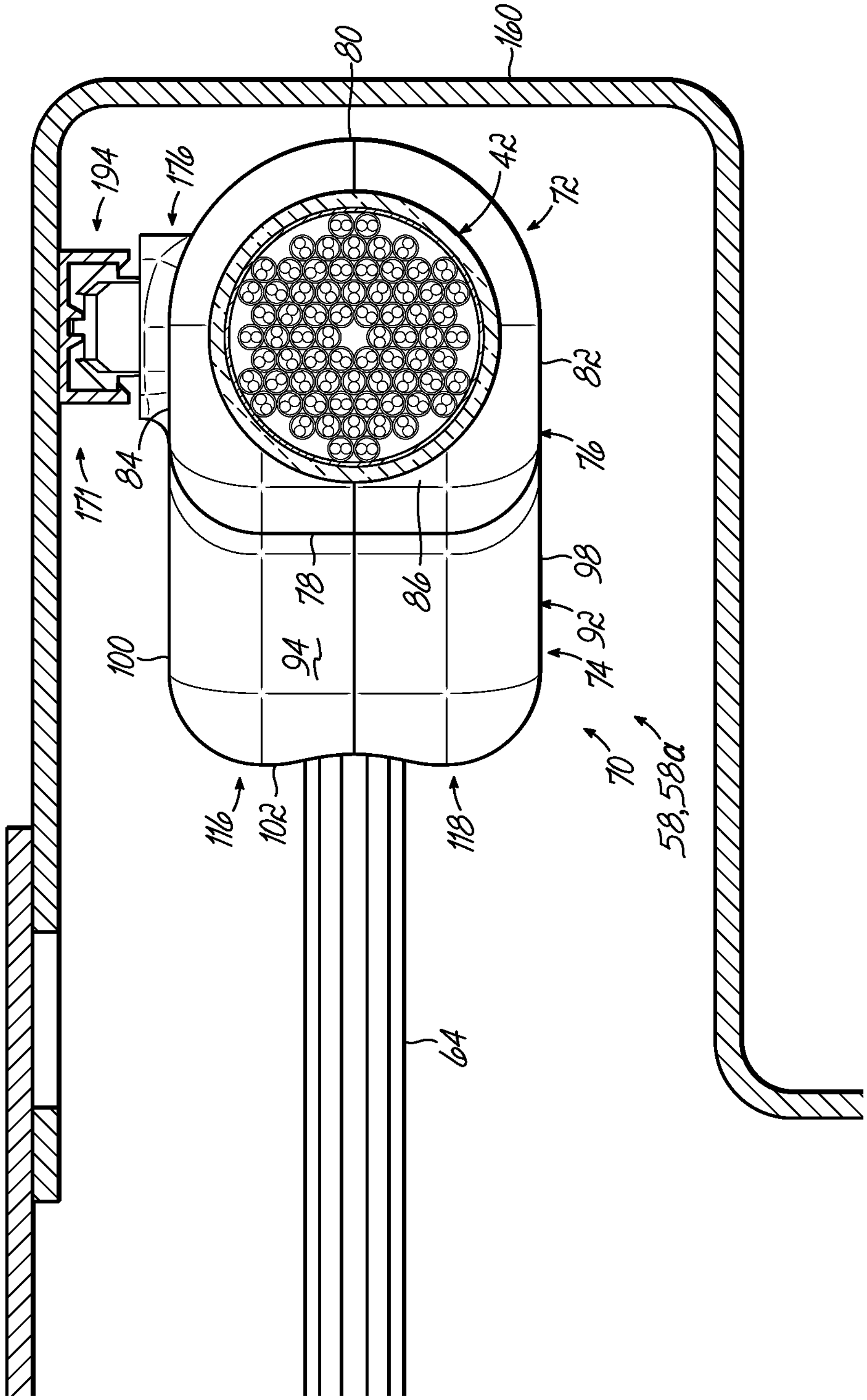
Figure 11C:
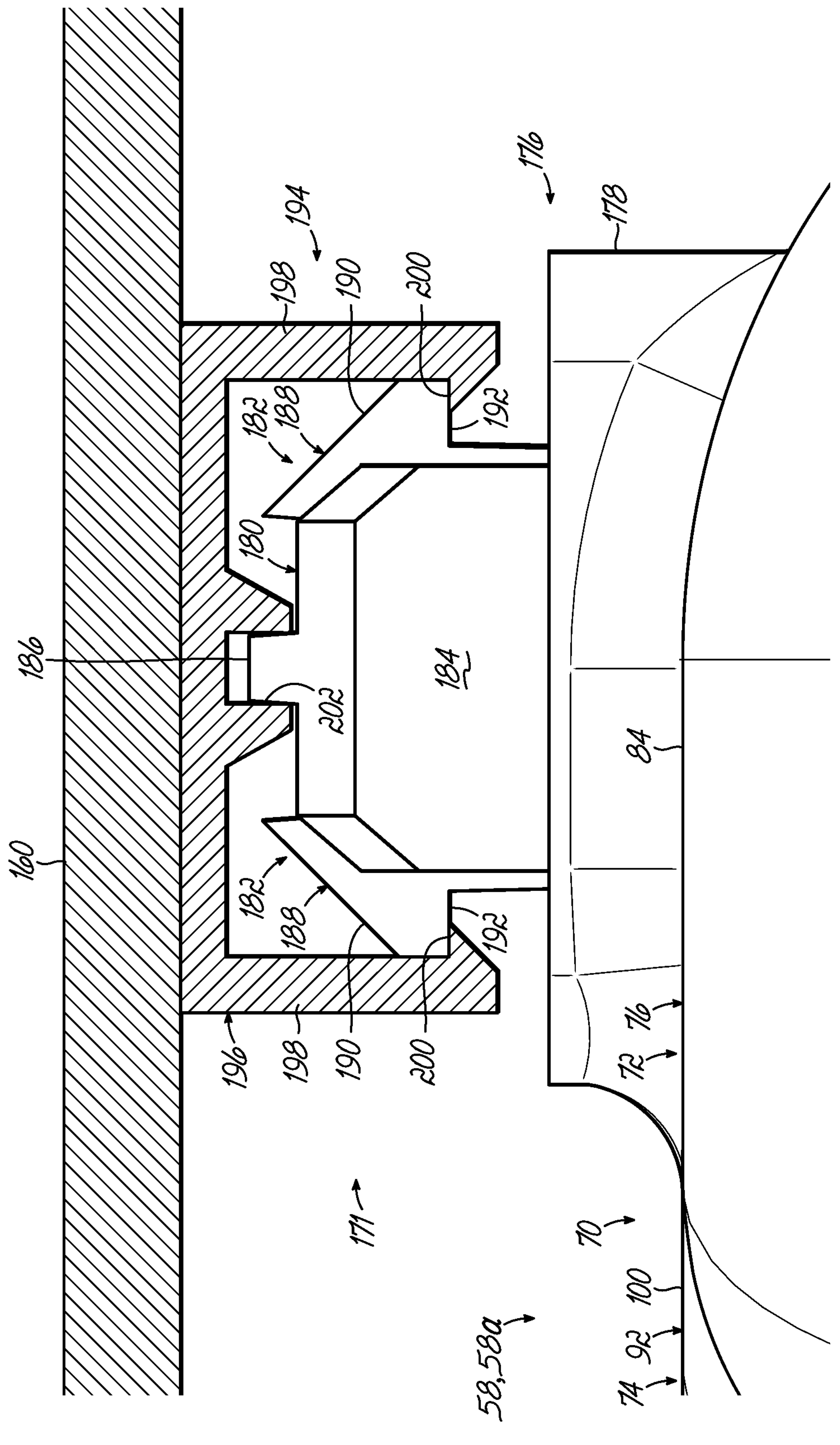

FIGS. 11A-11C illustrate an alternative embodiment of a connection means 170 for securing the at least one distribution housing 58, 58*a* to the rack 32. In this embodiment, the connection means 170 may include a spring clip 176 on at least one or both of the front side wall 82 and the rear side wall 84 of the tubular portion 72 of the distribution housing 58, 58*a*. In an exemplary embodiment, each of the front side wall 82 and the rear side wall 84 may include a spring clip 176 to secure the distribution housing 58, 58*a* to the rack 32. It should be realized, however, that in alternative embodiments the spring clip 176 may be included on other walls of the tubular portion 72, such as the lower wall 80, depending on the desired position of the rack cable assembly 40 in the rack 32. In an exemplary embodiment, the spring clip 176 includes a base 178, an H-shaped support 180 extending from the base 178, and a pair of flexible spring arms 182 extending from the base 178 and positioned between the uprights 184 and on opposite sides of the cross bar 186 of the H-shaped structure 180. Each spring arm 182 includes an arrow-shaped head 188 having an angled cam surface 190 and an abutment surface 192 opposite to the cam surface 190.

In this embodiment, the spring clip 176 is configured to engage with a fixture 194 on the rack 32. As illustrated in FIGS. 11B and 11C, the fixture 194 on the rack 32 includes a C-shaped mount 196 that defines a pair of opposed mount arms 198. Each mount arm 198 includes an inner facing abutment surface 200. To secure the at least one distribution housing 58, 58*a* to the rack 32 using the spring clip 176, the distribution housing 58, 58*a* is positioned adjacent a selected fixture 194 such that the cam surface of the spring arms 182 engage with the mount arms 198 on the C-shaped mount 196. As the distribution housing 58, 58*a* is pressed toward the C-shaped mount 196, the spring arms 182 flex inwardly toward each other to allow the arrow-shaped heads 188 to pass by the ends of the mount arms 198. When the arrow-shaped heads 188 move past the ends of the mount arms 198, the spring arms 182 snap back toward their normal position such that the abutment surface 192 of the arrow-shaped heads 188 engages the abutment surface 200 of the mount arms 198 to thereby secure the distribution housing 58, 58*a* to the rack 32. In a further embodiment, the C-shaped mount 196 may include a channel 202 in a central region between the two opposed mount arms 198. When the distribution housing 58, 58*a* is connected to the rack 32, the crossbar 186 of the H-shaped structure 180 may be configured to be positioned in the channel 202 in the mount 196. This engagement provides additional stability of the at least one distribution housing 58 relative to the rack 32.

Figure 12:
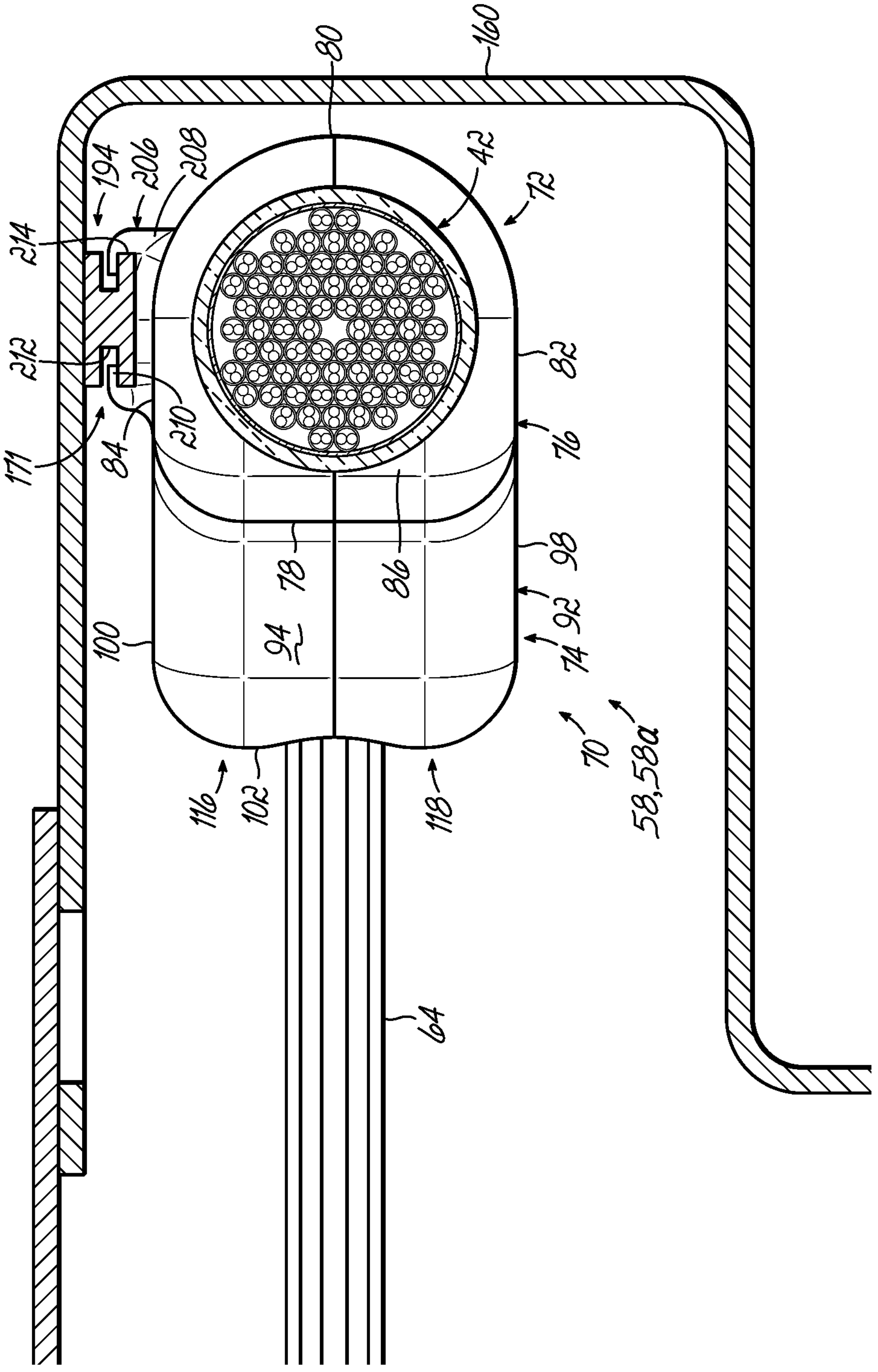
FIG. 12 illustrates a further alternative connection means for a distribution housing on the fiber optic cable assembly and the attachment of the distribution housing to the rack using the connection means.

FIG. 12 illustrates a further alternative embodiment of a connection means 170 for securing the at least one distribution housing 58, 58*a* to the rack 32. In this embodiment, the connection means 170 may include a C-shaped slide channel 206 on at least one or both of the front side wall 82 and the rear side wall 84 of the tubular portion 72 of the distribution housing 58, 58*a*. In an exemplary embodiment, each of the front side wall 82 and the rear side wall 84 may include a slide channel 206 to secure the distribution housing 58, 58*a* to the rack 32. It should be realized, however, that in alternative embodiments the slide channel 206 may be included on other walls of the tubular portion 72, such as the lower wall 80, depending on the desired position of the rack cable assembly 40 in the rack 32. In an exemplary embodiment, the slide channel 206 includes a base 208 and a pair of L-shaped arms 210 extending from the base and collectively defining the C-shaped channel 206.

In this embodiment, the slide channel 206 is configured to engage with a fixture 194 on the rack 32. As illustrated in FIGS. 12, the fixture 194 on the rack 32 includes a neck 212 and an enlarged head 214 connected thereto. To secure the at least one distribution housing 58, 58*a* to the rack 32 using the slide channel 206, the distribution housing 58, 58*a* is positioned adjacent a selected fixture 194 and moved so that the head 214 of the fixture slides into an opened end of the slide channel 206 and the neck 212 is positioned between the ends of the two L-shaped arms 210. The slide channel 206 may include a latch or other closure (not shown) such that the distribution housing 58, 58*a* cannot slide back and disengage from the fixture 194.

In the embodiments of the distribution housings 58, 58*a* discussed above, each equipment bay 168 in the rack 32 had a dedicated distribution housing 58, 58*a* with tap cables 64 and tap connectors 64 for connection to the ports 170 of the network equipment 18 in the equipment bay 168 (i.e., a one-to-one correspondence between distribution housings 58, 58*a* and equipment bays 168). In an alternative embodiment however, the rack cable assembly 40 may include a plurality of distribution housings 58, 58*a* where at least one distribution housing includes tap cables 64 configured to serve multiple equipment bays 168. More particularly, at least one distribution housing 58, 58*a* of rack cable assembly 40 may include tap cables 64 configured to serve two adjacent equipment bays 168 in the rack 32.

Figure 13:
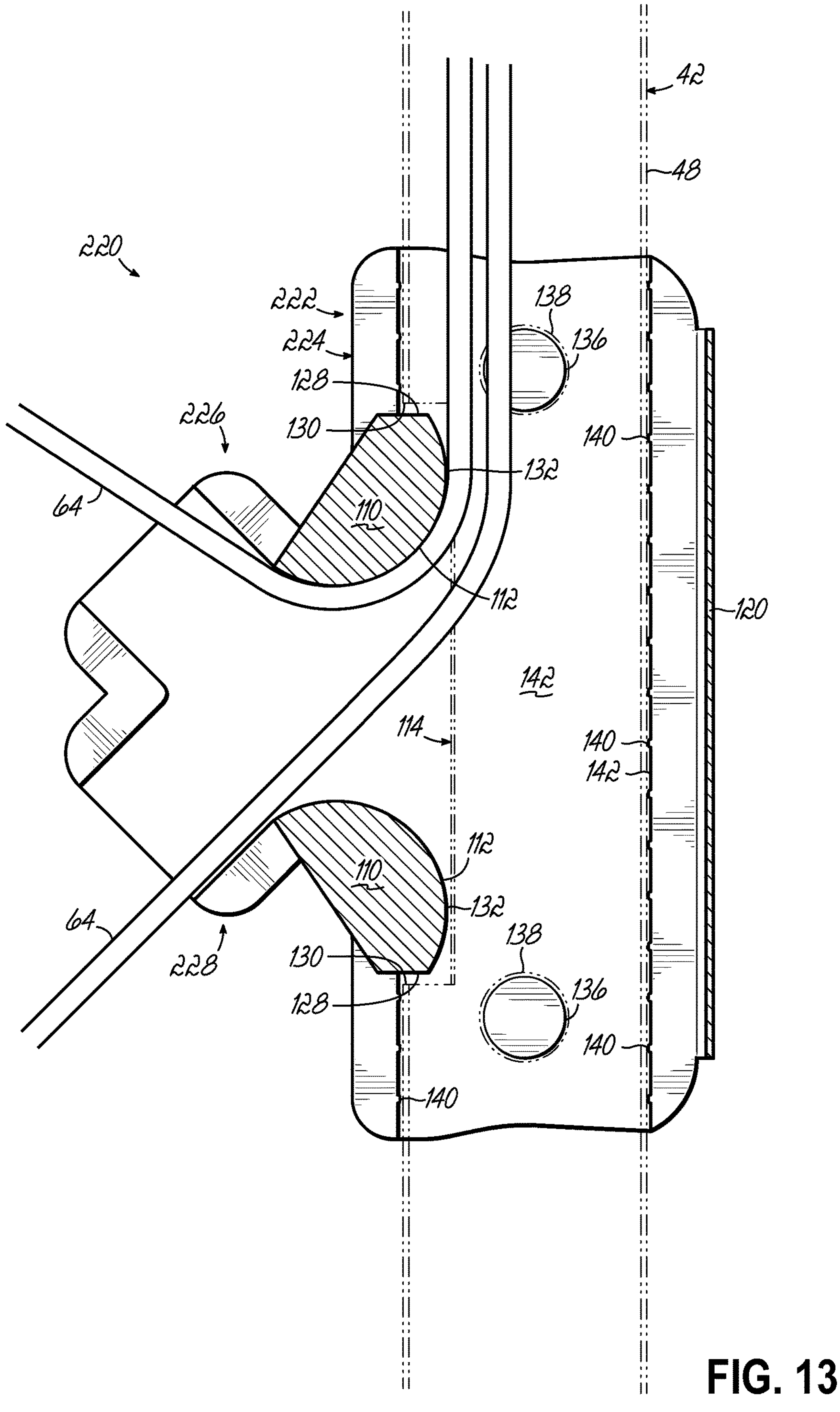
FIG. 13 is a cross-sectional view of a distribution housing for the fiber optic cable assembly according to another embodiment of the disclosure that serves two equipment bays in the rack.

FIG. 13 illustrates a distribution housing 220 configured to serve two adjacent equipment bays 168 in the rack 32. In this embodiment, the distribution housing 220 includes a main body 222 having a generally straight tubular portion 224, a first branch portion 226, and a second branch portion 228 extending from a side wall of the tubular portion 224. The distribution housing 220 may be similar in its design and operation to distribution housings 58, 58*a* described above, and for sake of brevity only the main differences will be described in detail. One main difference is that instead of just having a single branch portion, the distribution housing 220 may include two branch portions 226, 228 extending from the tubular portion 224. Additionally, the two branch portions 226, 228 may extend from the tubular portion 224 at non-perpendicular angles relative to the tubular portion 224. For example, the two branch portions 226, 228 may extend from the tubular portion 224 to form a V. In one embodiment, the included angle of the V may be between about 60° and about 120°. In a preferred embodiment, the included angle α may be about 90°. Other values of the included angle may also be possible. The V-shaped configuration of the branch portions 226, 228 is configured to direct the tap cables 64 to the two adjacent equipment bays 128 in the rack 32.

When the rack cable assembly 40 includes one or more of the distribution housings 220 as described above, the rack cable assembly 40 may be configured such that the distribution housing 220 is located at the boundary between the two adjacent equipment bays 128. In this way, for example, a first group of tap cables 64 (e.g., twelve tap cables 64) may extend from the first branch portion 226 such that the tap connectors 66 thereof may be connected to the ports 170 of the network equipment 18 in a first equipment bay 128, and a second group of tap cables 64 (e.g., twelve tap cables 64) may extend from the second branch portion 228 such that the tap connectors 66 thereof may be connected to the ports 170 of the network equipment 18 in the second, adjacent equipment bay 128. This "two-bay" configuration provides fewer distribution housings 220 along the length of the rack cable assembly 40, but also requires longer tap cable lengths $L_{tap}$ relative to the embodiments described above for distribution housings 58, 58*a*.

As illustrated in FIG. 13, the distribution housing 220 may include a pair of mandrels 110 that operate similar to the mandrels 110 in distribution housings 58, 58*a* regarding limiting bending of the tap cables 64. Moreover, the distribution housing 220 may also include the various movement restrictors described above in reference to distribution housings 58, 58*a*, including the lock pin 136/lock receiver 138 pairings and friction-enhancing elements 140. Furthermore, the distribution housing 220 may be formed from half shells much like half shells 116, 118, 116*a*, 118*a* and include the various symmetries and asymmetries of those embodiments described above. In addition, the distribution housing 220 may provide bidirectionality, i.e., equally effective in two different orientations, as described above.

Figure 14:
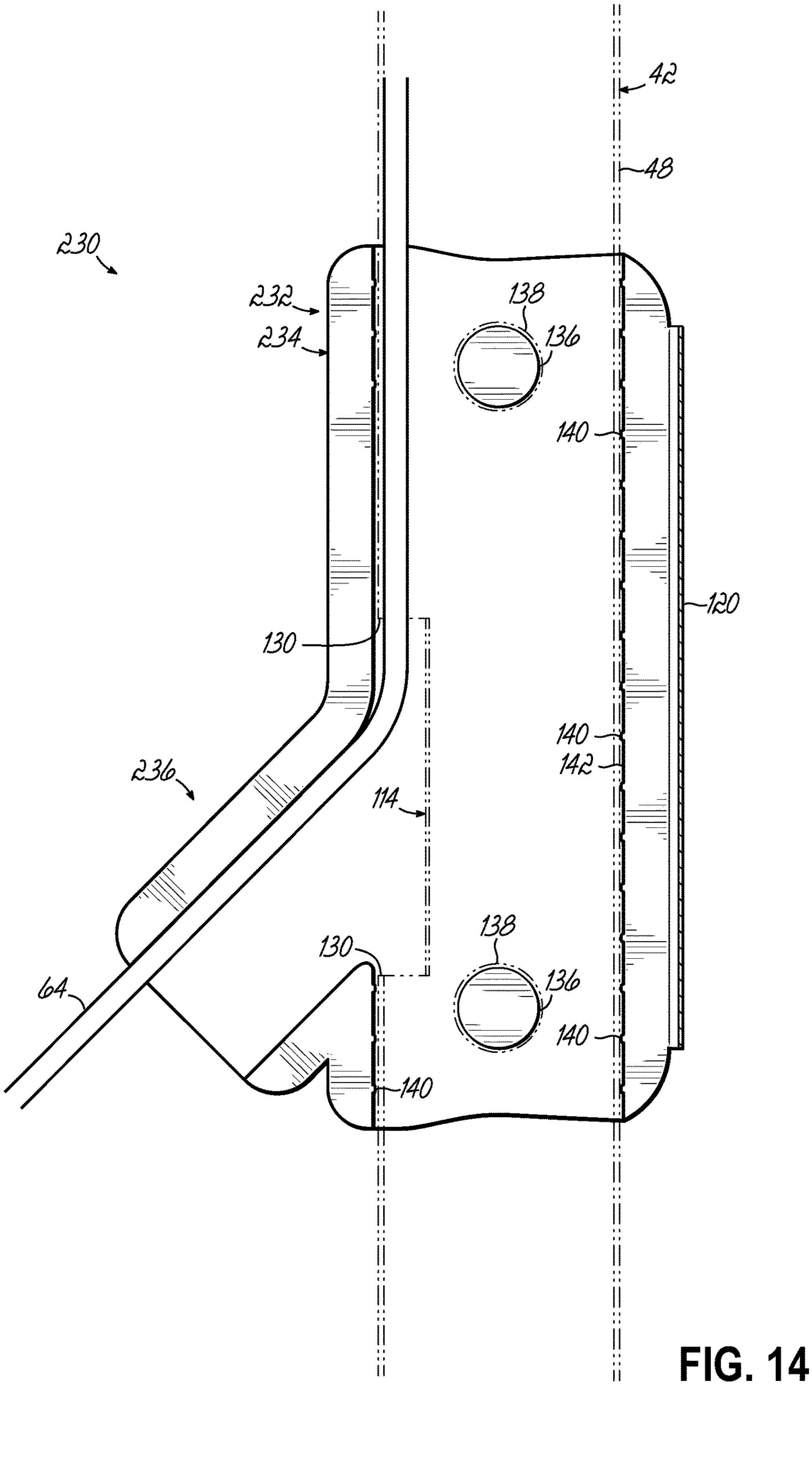
FIG. 14 is a cross-sectional view of a distribution housing for the fiber optic cable assembly according to another embodiment of the disclosure that uses a curved portion of the branch portion as a bend limiter.

FIG. 14 illustrates another distribution housing 230 similar to distribution housing 220 described above but configured to serve only a single equipment bay 168 in the rack 32 (similar to distribution housings 58, 58*a*). In this embodiment, the distribution housing 230 includes a main body 232 having a generally straight tubular portion 234, and a branch portion 236 extending from a side wall of the tubular portion 234. The distribution housing 230 may be similar in its design and operation to distribution housing 58, 58*a* described above and for sake of brevity only the main differences will be described in detail. For example, one main difference is that instead of using a mandrel on the inside of the distribution housing 230 to limit bending of the branched-off tap cables 64, the distribution housing 230 provides a curved branch portion 236 instead of a straight branch portion. Thus, for example, a wall of the branch portion 236 is arcuate and smoothly transitions with the tubular portion 234 to limit bending of the tap cables 64 extending through the branch portion 236. By using the curvature of the branch portion 236, the use of mandrels 160 inside the distribution housing 230 may be avoided. This may provide a simplified process (e.g., a molding process).

As illustrated in FIG. 14, the distribution housing 230 may include the various movement restrictors described above in reference to distribution housings 58, 58*a*, including the lock pin 136/lock receiver 138 pairings and friction enhancing elements 140. Furthermore, the distribution housing 220 may be formed from half shells much like half shells 116, 118, 116*a*, 118*a* and include the various symmetries and asymmetries of those embodiments described above. However, unlike distribution housings 58, 58*a* described above, the distribution housing 230 does not provide bidirectionality. Instead, the distribution housing 230 has to be connected to the fiber optic cable 42 in a particular orientation, i.e., with the branch portion 236 extending toward the outlet side of the distribution housing 230. Should the distribution housing 230 be connected to the fiber optic cable 42 in an inverted orientation, the tap cables 64 may experience a sharp corner or turn that will likely damage or break the tap cables 64. Thus, while the distribution housing 230 can operate effectively on the rack cable assembly 40, care must be taken during the assembly of the cable 40.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The disclosure in its broader aspects is therefore not limited to the specific details, representative apparatus and methods and illustrative examples shown and described. Accordingly, departures may be made from such details without departing from the scope of the disclosure.

What is claimed is:

1. A fiber optic cable assembly for an equipment rack supporting network equipment, comprising:

a fiber optic cable having a distribution end, a terminal end, and a plurality of optical fibers, the plurality of optical fibers being terminated at the distribution end by a plurality of distribution connectors;

a plurality of distribution housings attached to the fiber optic cable in spaced relation along a length of the fiber optic cable, wherein each of the plurality of distribution housings comprises:

a tubular portion having an inlet end, an outlet end, and a first passageway extending between the inlet end and the outlet end, the first passageway configured to receive at least some of the plurality of optical fibers;

at least one branch portion extending from the tubular portion and having a branch inlet end coupled to the tubular portion, a branch outlet end located between the inlet end and the outlet end of the tubular portion, and a second passageway extending between the branch inlet end and the branch outlet end, the second passageway intersecting and being in communication with the first passageway, and the second passageway configured to receive a subset of the at least some of the plurality of optical fibers received through the inlet end of the tubular portion, the subset of the the at least some of the plurality of optical fibers defining a plurality of tap cables, and the plurality of tap cables being terminated by a plurality of tap connectors; and at least one bend limiter adjacent the intersection between the first passageway and the second passageway to limit bending of the plurality of tap cables.

2. The fiber optic cable assembly of claim 1, wherein the at least one bend limiter includes a mandrel defining an arcuate surface, the arcuate surface configured to limit bending of the plurality of tap cables.

3. The fiber optic cable assembly of claim 2, wherein the at least one bend limiter includes a pair of mandrels on opposed sides of the intersection between the first passageway and the second passageway.

4. The fiber optic cable assembly of claim 1, wherein the at least one branch portion has a curved shape, and wherein the at least one bend limiter is formed by a curved surface of the branch portion.

5. The fiber optic cable assembly of claim 1, wherein each of the plurality of distribution housings further comprises:

a first half shell; and a second half shell, wherein the first half shell and the second half shell are connected together to form the distribution housing.

6. The fiber optic cable assembly of claim 5, wherein the first half shell and the second half shell are pivotally connected and moveable between an opened position, where the at least some of the plurality of optical fibers are insertable into the first passageway and the second passageway, and a closed position, where the at least some of the plurality of optical fibers are enclosed by the distribution housing.

7. The fiber optic cable assembly of claim 5, wherein the first half shell and the second half shell are identical to each other.

8. The fiber optic cable assembly of claim 5, wherein the first half shell includes at least one projection and the second half shell includes at least one pocket, and wherein when the first half shell is coupled to the second half shell, the at least one projection is received in the at least one pocket to form at least one mandrel.

9. The fiber optic cable assembly of claim 5, wherein the first half shell includes a first pocket and a first projection, wherein the second half shell includes a second pocket and a second projection, and wherein when the first half shell is coupled to the second half shell, the first projection is received in the second pocket and the second projection is received in the first pocket to form a pair of mandrels.

10. The fiber optic cable assembly of claim 1, wherein the at least one branch portion includes one branch portion that extends in a direction substantially perpendicular to the tubular portion.

11. The fiber optic cable assembly of claim 1, wherein the at least one branch portion includes a first branch portion that extends toward the terminal end of the fiber optic cable.

12. The fiber optic cable assembly of claim 11, wherein the at least one branch portion includes a second branch portion that extends toward the distribution end of the fiber optic cable.

13. The fiber optic cable of claim 1, wherein each of the plurality of distribution housings further comprises at least one movement limiter configured to limit the movement of the distribution housing relative to the fiber optic cable.

14. The fiber optic cable assembly of claim 13, wherein the at least one movement limiter includes at least one abutment surface on the at least one mandrel, and wherein the at least one abutment surface is configured to engage an edge of a slot in the fiber optic cable to limit the movement of the distribution housing relative to the fiber optic cable.

15. The fiber optic cable assembly of claim 14, wherein the at least one movement limiter comprises at least one lock pin extending into the first passageway of the tubular portion, and wherein the at least one lock pin is configured to engage a corresponding at least one lock receiver in the fiber optic cable to limit the movement of the distribution housing relative to the fiber optic cable.

16. The fiber optic cable assembly of claim 14, wherein the at least one movement limiter includes friction-creating elements in the first passageway of the tubular portion, and wherein the friction-creating elements are configured to engage with the at least some of the plurality of optical fibers to limit the movement of the distribution housing relative to the fiber optic cable.

17. The fiber optic cable assembly of claim 1, wherein at least one of the plurality of distribution housings includes at least one connection means for attaching the rack cable assembly to the equipment rack.

18. An equipment rack for a fiber optic network, comprising:

a patch panel arranged in the equipment rack and having a plurality of first connection ports, wherein the plurality of first connection ports is configured to be connected to the fiber optic network;

a plurality of equipment bays defined in the equipment rack, wherein each of the plurality of equipment bays includes network equipment defining a plurality of second connection ports; and a fiber optic cable assembly comprising:

a fiber optic cable having a distribution end, a terminal end, and a plurality of optical fibers, the plurality of optical fibers being terminated at the distribution end by a plurality of distribution connectors;

a plurality of distribution housings attached to the fiber optic cable in spaced relation along a length of the fiber optic cable, wherein each of the plurality of distribution housings comprises:

a tubular portion having an inlet end, an outlet end, and a first passageway extending between the inlet end and the outlet end, the first passageway configured to receive at least some of the plurality of optical fibers;

at least one branch portion extending from the tubular portion and having a branch inlet end coupled to the tubular portion, a branch outlet end located between the inlet end and the outlet end of the tubular portion, and a second passageway extending between the branch inlet end and the branch outlet end, the second passageway intersecting and being in communication with the first passageway, and the second passageway configured to receive a subset of the at least some of the plurality of optical fibers received through the inlet end of the tubular portion, the subset of the the at least some of the plurality of optical fibers defining a plurality of tap cables, and the plurality of tap cables being terminated by a plurality of tap connectors; and at least one bend limiter adjacent the intersection between the first passageway and the second passageway to limit bending of the plurality of tap cables;

wherein the plurality of distribution connectors is connected to respective first connection ports in the patch panel, wherein the plurality of tap connectors at each of the plurality of distribution housings is connected to respective second connection ports in at least one equipment bay in the equipment rack, and wherein the fiber optic cable assembly is attached to the equipment rack so that each of the plurality of distribution housings is adjacent to the at least one equipment bay to which its plurality of tap cables is connected.

19. The equipment rack according to claim 18, wherein the plurality of tap cables from each of the plurality of distribution housings is connected to respective second connection ports associated with only one equipment bay in the equipment rack.

20. The equipment rack according to claim 18, wherein the plurality of tap cables from at least one of the plurality of distribution housings is connected to respective second connection ports associated with only two adjacent equipment bays in the equipment rack.

21. A fiber optic cable assembly for an equipment rack supporting network equipment, comprising:

a fiber optic cable having a distribution end, a terminal end, and a plurality of optical fibers, the plurality of optical fibers being terminated at the distribution end by a plurality of distribution connectors;

a plurality of distribution housings attached to the fiber optic cable in spaced relation along a length of the fiber optic cable, wherein each of the plurality of distribution housings comprises:

a tubular portion having an inlet end, an outlet end, and a first passageway extending between the inlet end and the outlet end, the first passageway configured to receive at least some of the plurality of optical fibers;

at least one branch portion extending from the tubular portion and having a branch inlet end coupled to the tubular portion, a branch outlet end, and a second passageway extending between the branch inlet end and the branch outlet end, the second passageway intersecting and being in communication with the first passageway, the second passageway extending in a direction transverse to the first passageway at the branch outlet end, and the second passageway configured to receive a subset of the at least some of the plurality of optical fibers received through the inlet end of the tubular portion, the subset of the the at least some of the plurality of optical fibers defining a plurality of tap cables, and the plurality of tap cables being terminated by a plurality of tap connectors; and at least one bend limiter adjacent the intersection between the first passageway and the second passageway to limit bending of the plurality of tap cables.

* * * * *